(12) United States Patent
Byrne

(10) Patent No.: US 8,987,642 B2
(45) Date of Patent: Mar. 24, 2015

(54) GROMMET ASSEMBLY ASSOCIATED WITH WORK SURFACES FOR HEATING AND COOLING LIQUIDS

(76) Inventor: Norman R. Byrne, Ada, MI (US)

(*) Notice: Subject to any disclaimer, the term of this patent is extended or adjusted under 35 U.S.C. 154(b) by 656 days.

(21) Appl. No.: 13/198,267

(22) Filed: Aug. 4, 2011

(65) Prior Publication Data

US 2012/0031888 A1    Feb. 9, 2012

Related U.S. Application Data

(63) Continuation-in-part of application No. 11/610,903, filed on Dec. 14, 2006, now Pat. No. 7,989,738, and a continuation-in-part of application No. 11/686,727, filed on Mar. 15, 2007, now abandoned.

(51) Int. Cl.
  *H05B 3/68*    (2006.01)
  *A47J 36/24*   (2006.01)

(52) U.S. Cl.
  CPC ................................. *A47J 36/2461* (2013.01)
  USPC ..................................................... 219/452.11

(58) Field of Classification Search
  USPC ............................................ 219/443.1–468.2
  See application file for complete search history.

(56) References Cited

U.S. PATENT DOCUMENTS

| | | | |
|---|---|---|---|
| 2,257,580 A * | 9/1941 | Trompeter | 219/418 |
| 2,485,990 A * | 10/1949 | Snow | 219/416 |
| 2,548,932 A * | 4/1951 | Ball | 219/218 |
| 2,992,315 A | 7/1961 | McDonnold | |
| 3,870,862 A | 3/1975 | Doner | |
| 3,986,337 A | 10/1976 | Richard | |
| 4,747,788 A | 5/1988 | Byrne | |
| 4,823,554 A | 4/1989 | Trachtenberg | |
| 4,960,978 A * | 10/1990 | Lorenz et al. | 219/448.17 |
| 5,351,173 A | 9/1994 | Byrne | |
| 5,941,077 A | 8/1999 | Safyan | |
| 5,990,456 A | 11/1999 | Kilbride | |
| 6,290,518 B1 | 9/2001 | Byrne | |
| 6,379,182 B1 | 4/2002 | Byrne | |

OTHER PUBLICATIONS

Tellurex Corporation, An Introduction to Thermoelectrics, 2006, pp. 1-7. Tellurex Corporation, Traverse City, Michigan.
Tellurex Z-Max Module Price List, May 17, 2006. Tellurex Corporation.
Tellurex Corporation, ZMAX Cooling Module Started Kit for Prototypes or Just Plain Fun!, website, 2006, Tellurex Corporation.
Tellurex Corporation, Engineered Solutions: Great Engineering for Great Thermoelectrics, website, Tellurex Corporation.

\* cited by examiner

*Primary Examiner* — Sang Y Paik
(74) *Attorney, Agent, or Firm* — Varnum, Riddering, Schmidt & Howlett LLP

(57) ABSTRACT

Grommet assemblies (600, 700, 800, 900) maintain liquids or other materials within vessels (606, 706, 806, 902) at desired temperatures selectively above or below ambient. Certain of the grommet assemblies (600, 700) are receivable within apertures (612, 712) within a work surface (604, 704). A thermoelectric device (638, 738) is utilized in combination with a hot/cold plate (620, 720) to selectively heat or cool liquids or other materials contained within the vessel (606, 706).

6 Claims, 32 Drawing Sheets

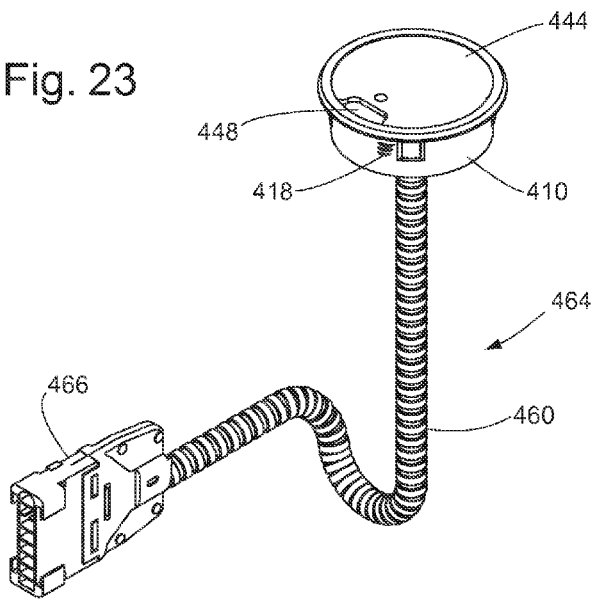
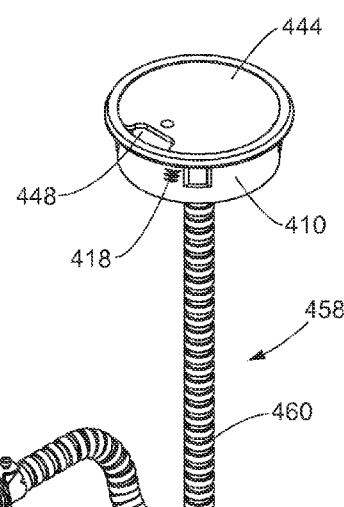
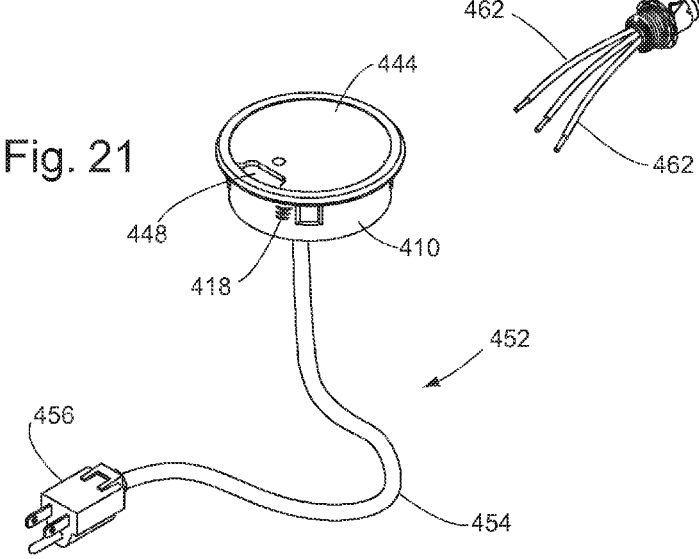

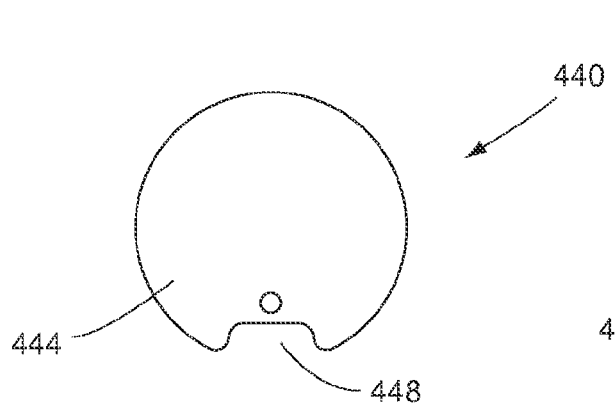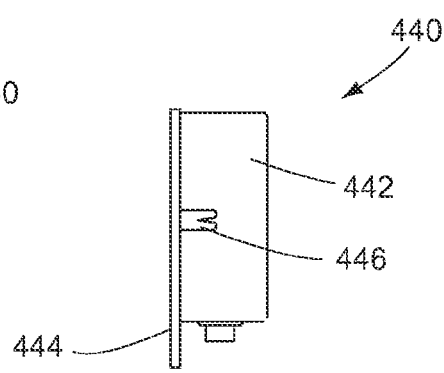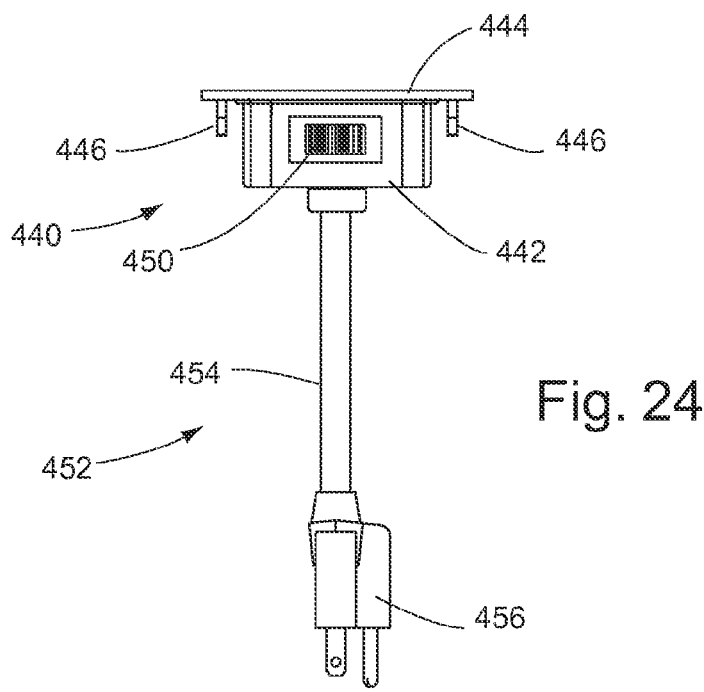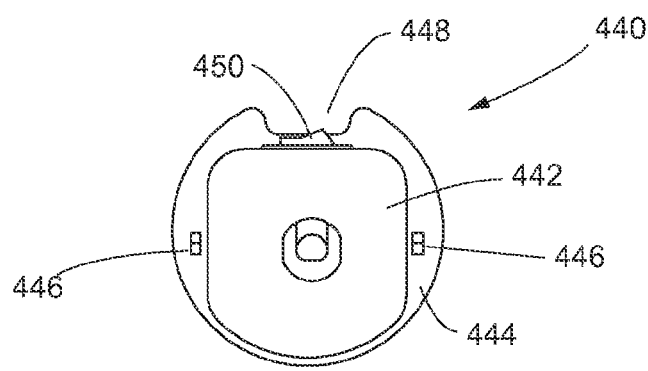

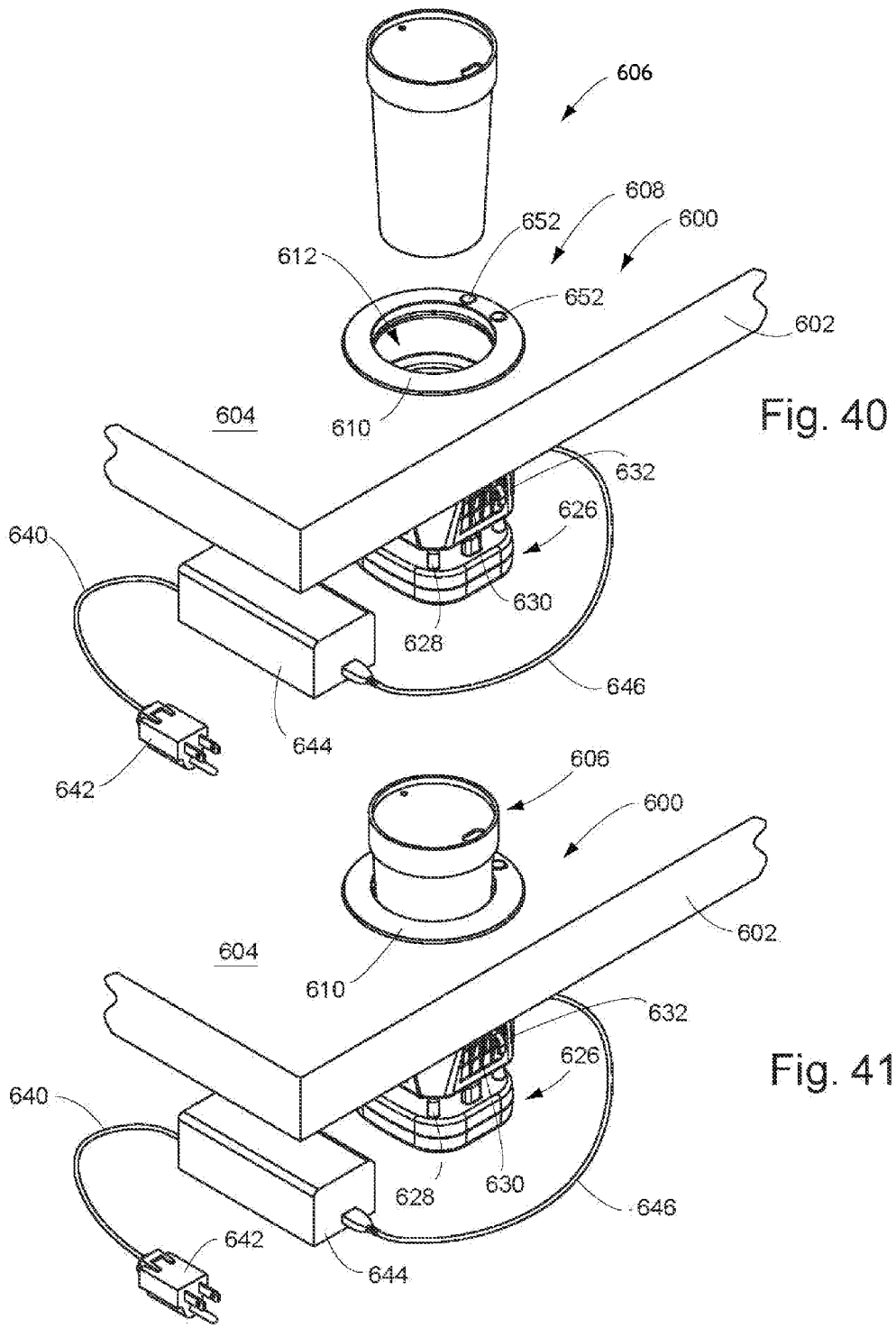

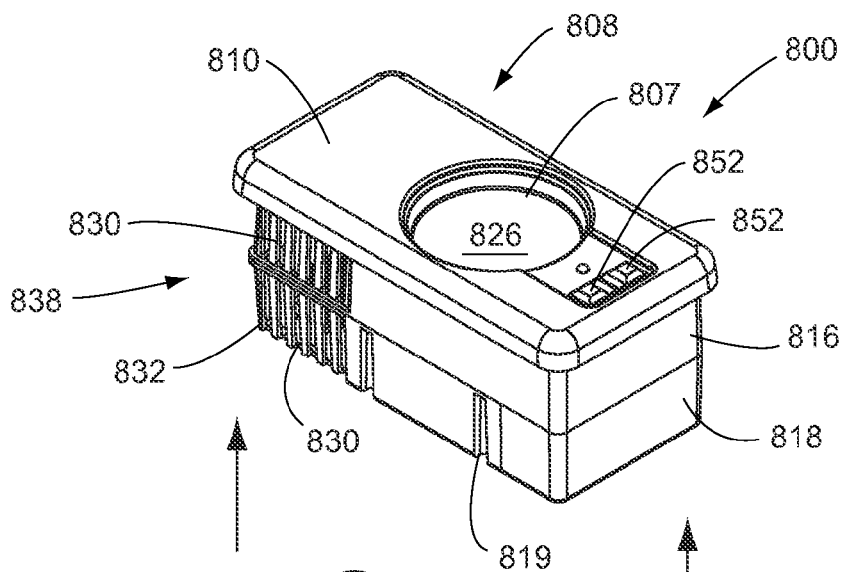
Fig. 58
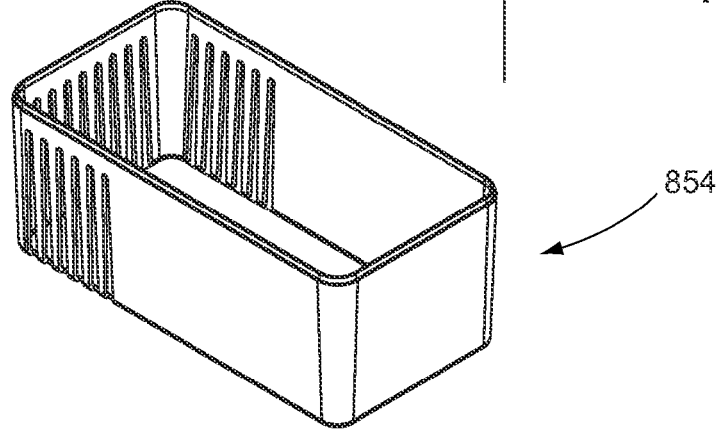
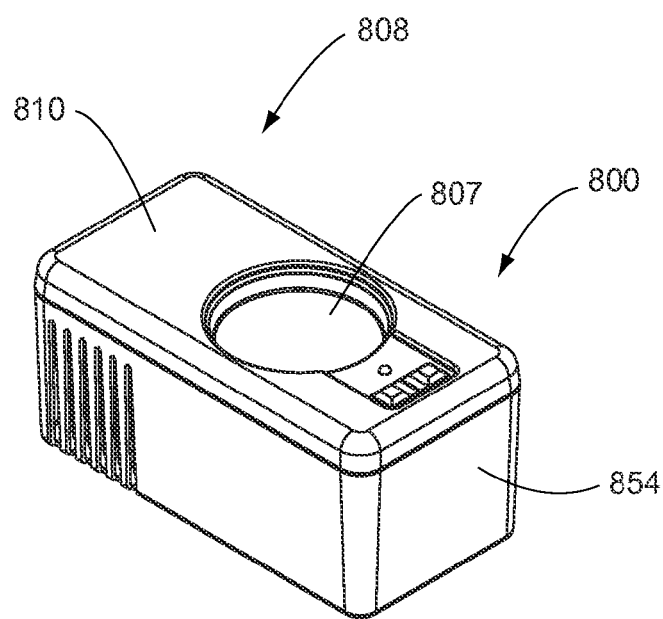
Fig. 59

GROMMET ASSEMBLY ASSOCIATED WITH WORK SURFACES FOR HEATING AND COOLING LIQUIDS

CROSS-REFERENCE TO RELATED APPLICATIONS

This application is a continuation-in-part of U.S. patent application Ser. No. 11/686,727 filed Mar. 15, 2007, which is a continuation-in-part of U.S. patent application Ser. No. 11/610,903 filed Dec. 14, 2006.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

The invention relates to devices for mounting on or in work surfaces and, more particularly, to grommet assemblies for collectively warming and cooling liquids with the assemblies.

2. Background Art

Efficient organization of devices requiring electrical power within an office, commercial, industrial or residential environment has been a historical problem. Such devices include lamps, typewriters and the like. More recently, this problem has been exacerbated by the proliferation of additional devices for communications, such as complex telephone stations, computers, video displays and the like. The primary problems associated with the efficient organization and use of such devices relate to the abundance of wiring arrays and the positioning of the energy-requiring devices within the environment, particularly in office environments.

The problems of convenience, efficiency and aesthetics have been addressed, to some extent, with respect to electrical receptacles and voice/data terminals. For example, it is known to mount electrical receptacles (and data terminals) on a work surface in a retractable manner, so that power cords and communication cables may easily be connected to the electrical receptacles and terminals above the work surface, but both the cords and receptacles may be retracted below the work surface while maintaining power and communications to the user devices.

One relatively substantial advance in the art relating to the mounting of electrical receptacles in a retractable manner in work surfaces and the like, is shown in the commonly owned U.S. Patent to Byrne U.S. Pat. No. 4,747,788 issued May 31, 1988. In the Byrne patent, a retractable power center includes a retainer housing formed in the work surface, with a clamping arrangement to secure the housing to the work surface. A lower extrusion is connected to a lower portion of the housing, and a manually movable power carriage mounts receptacles. In response to manual application of upward forces on the power carriage, the carriage may be raised upward into an extended, open position. Small bosses extending from the sides of the carriage, resting on the top portion of the housing, support the carriage in the extended, open position. In the open position, the user can energize desired electrical devices from the receptacles, and then lower the carriage into a releasably secured, retractable position.

The Byrne '788 patent represents a substantial advance with respect to retractable power centers mounted on work surfaces and the like. In addition to the Byrne '788 patent, another relatively substantial advance in the art is disclosed in the commonly owned U.S. Patent to Byrne U.S. Pat. No. 5,351,173 issued Sep. 27, 1994. In the Byrne '173 patent, a retractable communications terminal center includes voice/data terminals adapted to be mounted in a work surface. The communications terminal center includes a lighting arrangement for providing illumination in the vicinity of the energy center. A pivot arrangement is coupled to the lighting configuration and to the energy center power carriage so as to provide a positional adjustment of the lighting arrangement relative to the carriage.

In addition to retractable energy center configurations, it is known to provide for relatively stationery configurations which are extremely accessible to electrical and communication devices on the work surfaces. However, although such configurations normally are stationery, it has been found to be advantageous to provide for such energy centers to be adjustable as to their particular position on or around a work surface. A substantial advance in the art with respect to such energy center configuration is disclosed in the commonly owned U.S. Patent to Byrne U.S. Pat. No. 6,379,182 issued Apr. 30, 2002. The Byrne '182 patent is described in substantial detail in subsequent paragraphs herein.

In addition to providing for work surface access to electrical receptacles and data terminals, it would be advantageous if such accessibility extended to other types of office applications. For example, one staple of almost all commercial, industrial and residential environments is the conventional coffee pot and hot water dispensers (for tea, chocolate or the like). Such coffee pot and water dispenser assemblies are utilized not only to brew liquids, but also to maintain their warmth. In this regard, however, after a user pours a cup of coffee or other liquid into a conventional cup, the liquid will cool relatively quickly. Often, such cooling occurs at a rate faster than the liquid is consumed by the user. When this occurs, the user is required to throw out the cooled coffee or other liquid, and refill the user's cup. This requires time and wasting of energy, since the user would typically have to walk from the user's work station to the coffee pot or hot water dispenser, and must also find a place to dispose of the cooled liquid. Accordingly, it would be advantageous if the user had means to maintain the coffee or other liquid at a desired, raised temperature, without requiring constant movement between typical coffee brewing assemblies and hot water dispensers, and the user's work station.

Still further, in addition to warming (and maintaining warmth) of liquids, it would also be advantageous to provide for the cooling of various types of liquids, and maintaining liquids at a desired cooled temperature. This is true with respect to colas, iced tea and similar beverages. However, many known types of products and methods for cooling or maintaining coolness of liquids can be relatively expensive, bulky or otherwise impractical. For example, in addition to the obvious process of putting ice cubes into beverages holders, is also known to maintain ice around beverage containers. Further, however, the use of such ice may be impractical because it may require constant replenishment and the resulted melted water may be a nuisance to dispose. Also, other refrigeration devices are required to produce the ice. In place of ice, known refrigeration means may be utilized, including such components such as compressors, Freon chambers and related devices. However, such refrigeration devices tend to be bulky and relatively expensive. Many such devices also consume a substantial amount of power.

In brief summary, it would be advantageous to provide for a liquid warming assembly which may be utilized on or within a work surface, and which would be relatively inexpensive, consume small amounts of power and be of a relatively small size. Still further, it would also be advantageous to have similar types of devices for cooling liquids and for maintaining liquids at a temperature below an ambient temperature.

SUMMARY OF THE INVENTION

In accordance with the invention, a hot/cold grommet assembly is adapted for use in maintaining liquid or other materials in a vessel at a desired temperature. The grommet assembly is adapted to be mounted to a work table or other furniture item having a work surface. The assembly includes a grommet with a lower casing receivable within an aperture within the work surface. The grommet also includes an upper collar, with the casing forming a housing interior. Heating means are selectable by a user and positioned within a housing interior, and coupled to a hot/cold plate for selectively maintaining the liquid at a desired temperature above ambient temperature. Cooling means are positioned within the housing interior, and coupled to the hot/cold plate, for maintaining the temperature of the liquid or other materials in the vessel at a temperature below ambient. Power means are connected to the heating means and cooling means, so as to energize the same. Further, the upper collar of the grommet and the hot/cold plate are maintained substantially flush with an upper portion of the work surface.

In accordance with other aspects of the invention, the power connection means can include an electrical cord with a conventional plug positioned at a distal end of the cord. The plug is adapted to be plugged into a source of AC electrical power. A DC or low voltage adapter can be connected to another end of the AC electrical plug, and a DC or low voltage electrical cord can be connected at one end to an output of the adapter, and connected at an opposing end to the heating means and the cooling means.

Further, the power connection means can include a plug or jack adapted to be directly connected to a source of DC or low voltage power. A DC or low voltage core can be connected at one end to the DC or low voltage plug or jack, and connected at an opposing end to the heating means and the cooling means.

Still further, the grommet assembly can be positioned completely on top of the work surface. Also, the thermoelectric components of the grommet assembly can be positioned to the side and below the hot/cold plate.

BRIEF DESCRIPTION OF THE DRAWINGS

The invention will now be described with reference to the drawings in which:

FIG. 21 is a perspective and stand alone view of a cord version of the warmer grommet assembly in accordance with the invention;

FIG. 22 is a hardwire version of the warmer grommet assembly in accordance with the invention;

FIG. 23 is a warmer grommet assembly in accordance with the invention, showing the assembly with one of the inventor's known connectors;

FIG. 24 is a front elevation view, in a stand alone configuration, of the warmer grommet assembly in accordance with the invention;

FIG. 25 is a top, plan view of the warmer grommet assembly shown in FIG. 24;

FIG. 26 is a side, elevation view of the warmer grommet assembly shown in FIG. 24;

FIG. 27 is a bottom, underside view of the warmer grommet assembly shown in FIG. 24;

FIG. 40 is a perspective view showing the use of the hot/cold grommet assembly shown in FIG. 34, as the grommet assembly may be utilized with a cup, work surface and an electrical connection from an AC electrical plug through a low voltage adapter;

FIG. 41 is a perspective view similar to FIG. 40, but showing the cup holding the liquid to be heated or cooled as positioned in a recessed manner through the work surface;

FIG. 58 is a perspective view of the grommet assembly shown in FIG. 46, but showing the grommet assembly with a housing which can close the grommet assembly so that the grommet assembly may sit on top of a work surface or the like;

FIG. 59 is a perspective view similar to FIG. 58, but showing the grommet assembly and the housing in an assembled state;

DESCRIPTION OF THE PREFERRED EMBODIMENTS

The principles of the invention are disclosed, by way of example, within liquid warmer grommet assemblies 400 and 500 as illustrated in FIGS. 18-33, and within hot/cold grommet assemblies 600, 700, 800 and 900 as illustrated in FIGS. 34-72. In accordance with the invention, the warmer grommet assemblies 400, 500 provide for a means to maintain a cup of liquid (or other material) at a desired temperature through the use of a heating element which is insertable into a grommet mounted to a work surface or the like. Various types of electrical connections can be made to power sources so as to maintain the liquid at a desired temperature through the use of the heating element. The structure and functionality of the liquid warmer grommet assemblies 400, 500 in accordance with the invention preclude the necessity of any type of bulky (or electrically dangerous) burner or warmer assemblies positioned on the work surface so as to maintain liquid temperatures. Further, the warmer grommet assemblies 400, 500 in accordance with the invention preclude the necessity of the user having to constantly refill the liquid cup by getting up from the user's work station and going to the location of a coffee brewing station, hot water dispenser or the like.

In addition to the liquid warmer grommet assemblies 400, 500, the hot/cold grommet assemblies 600, 700, 800 and 900 also operate in accordance with the invention. However, distinguishable from the grommet assemblies 400 and 500, the hot/cold grommet assemblies 600, 700, 800 and 900 in accordance with the invention have the capability of not only warming (and maintaining warmth) of liquids or other materials positioned in cups or other holding devices, but also have the capability of selectively cooling (or maintaining coolness) of liquids or similar materials within cups or other holding devices.

Prior to describing the liquid warming grommet assemblies 400, 500 in accordance with the invention, two embodiments of energy centers that may be utilized on work surfaces are first described herein. These energy centers are known in the prior art and are described in detail in the previous referenced U.S. Patent to Byrne U.S. Pat. No. 6,379,182 issued Apr. 30, 2002. The energy center as described in the subsequent paragraphs herein do not specifically relate to any type of warming or cooling assemblies, but disclose concepts generally relating to the mounting of electrical interconnection apparatus on work surfaces.

A prior art energy center 100 is first described herein, and illustrated in FIGS. 1-8. A second embodiment of an energy center is then described herein, as energy center 300 illustrated in FIGS. 9-17.

Figure 1:
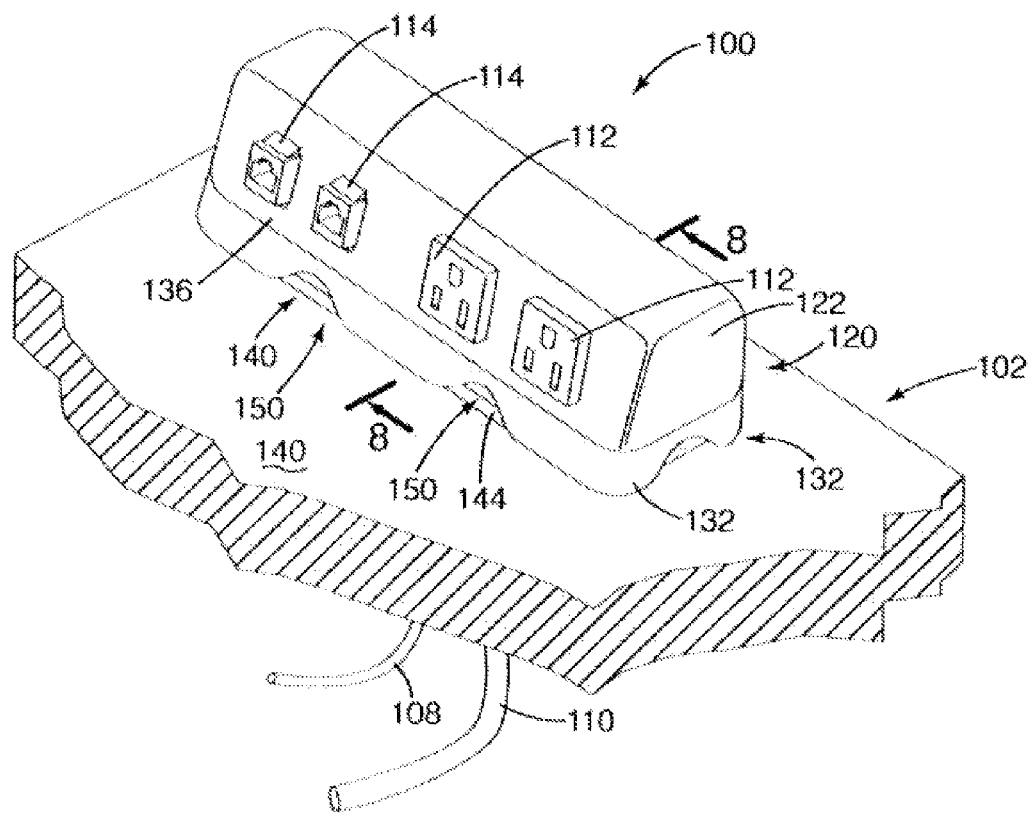
FIG. 1 is a perspective view of a prior art energy center having an interchangeable base support, and mounted to a work surface which is shown in a partial breakaway format.
Figure 2:
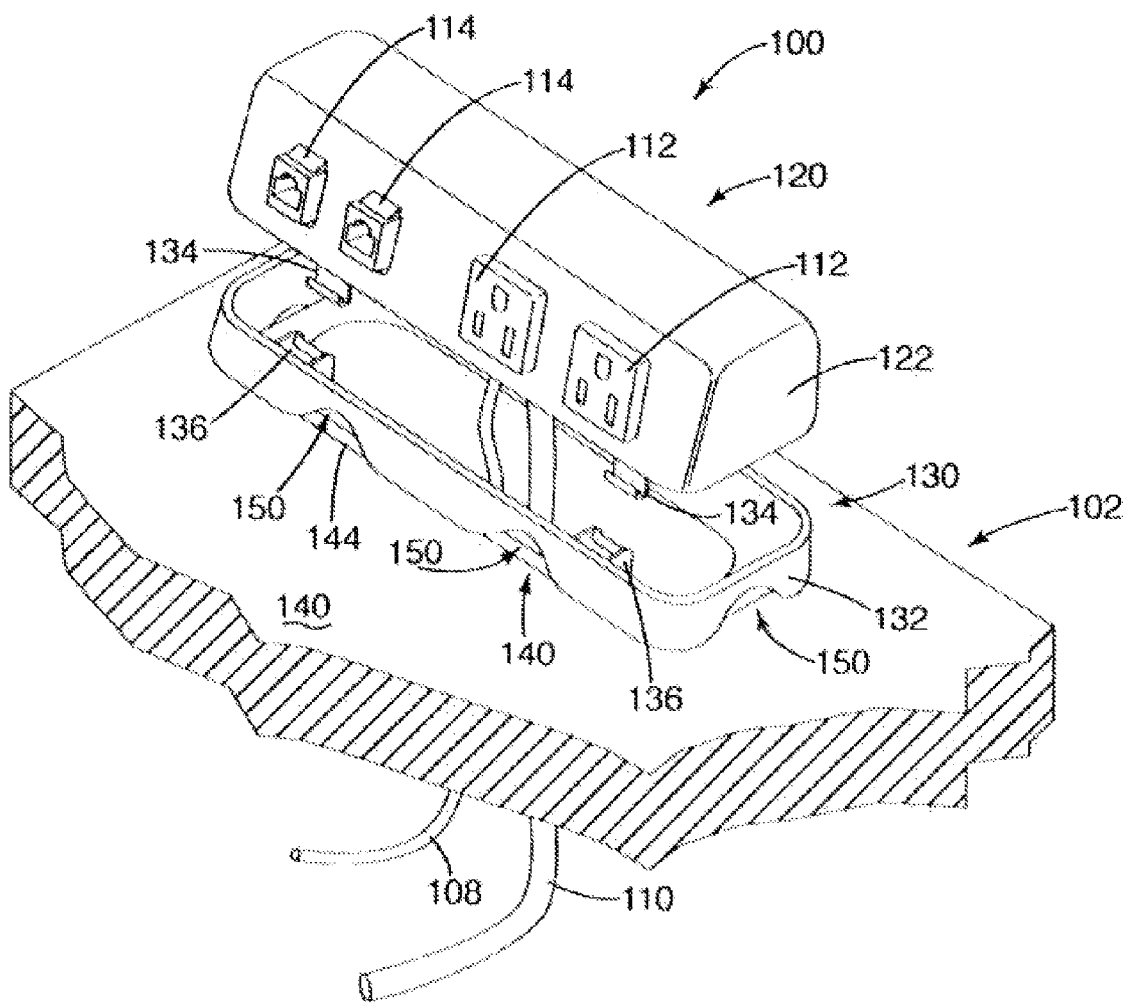
FIG. 2 is a partial exploded view of the energy center illustrated in FIG. 1, showing the energy center upper housing as separate from the energy center base support.

With reference first to FIGS. 1-9, the energy center 100 is adapted to be mounted within a furniture component such as the work surface 102. The work surface 102 includes a planer surface 104. Within the planer surface 104 is a formed slot 106 (illustrated in FIG. 8) which extends through the work surface 102. The energy center 100 is adapted to accept energy through energized conductors such as the data lines 108 and the electrical power cords 110. Only one of each of the data lines 108 and power cords 110 is illustrated in FIG. 1 and the subsequent drawings. The work surface 102 can, for example, be the working surface of a desk or similar furniture component. Typically, the work surface 102 may have a veneer as its planar surface 104 or other conventional protective and aesthetically desirable surface secured to the top of the work surface 102.

Typically, the power cords 110 would be interconnected with a conventional power source located below the work surface 102. The power cords 110 will provide a relatively simplistic structure and aesthetically desirable means for transferring power from the conventional power source located below the work surface 102 (the power source not being shown) to one or more electrical outlet receptacles associated with the energy center 100, such as the electrical outlet receptacles 112. By plugging into electrical outlet receptacles 112, other electrical devices (not shown) mounted on or near the work surface 102 may then be energized from the receptacles 112.

The data lines 108 can be interconnected to incoming voice/data nodes (not shown) also located below the work surface 102. As described in subsequent paragraphs herein, the data lines 108 can then be connected to the data ports 114. Through the use of the data ports 114, telephones, computer cable connectors or similar interconnections can be made for purposes of providing voice/data or similar communications to appropriate devices, such as telephones and computers.

Figure 8:
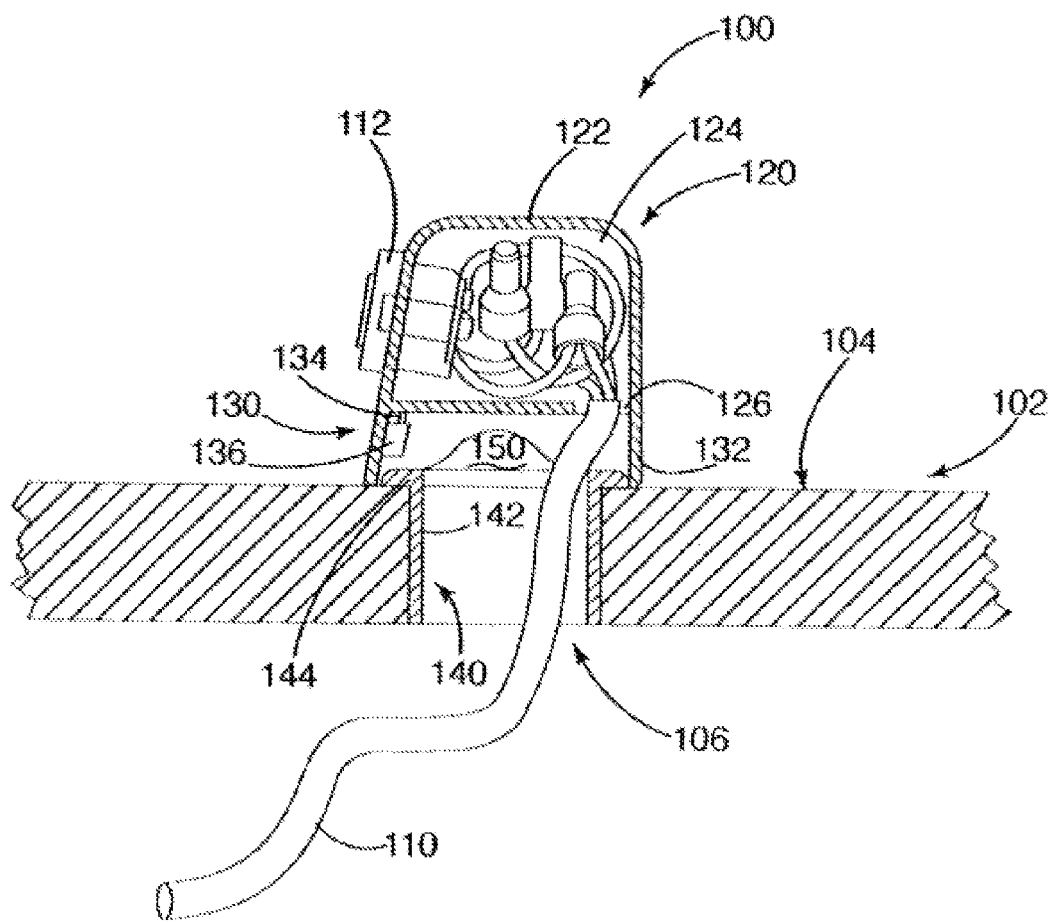
FIG. 8 is a sectional view of the energy center and work surface illustrated in FIG. 1, taken along section lines 8-8 of FIG. 1.
Figure 9:
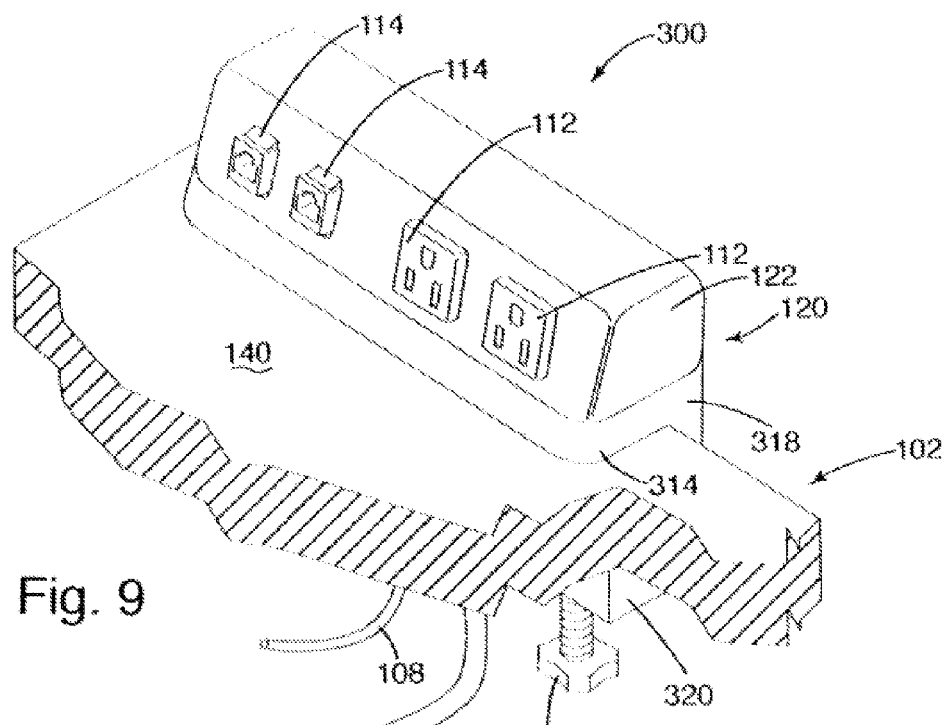
FIG. 9 is a perspective view of a second embodiment of an energy center with an interchangeable base support in accordance with the invention, and showing connection of the energy center to a work surface, with the work surface shown in a partial breakaway format.
Figure 10:
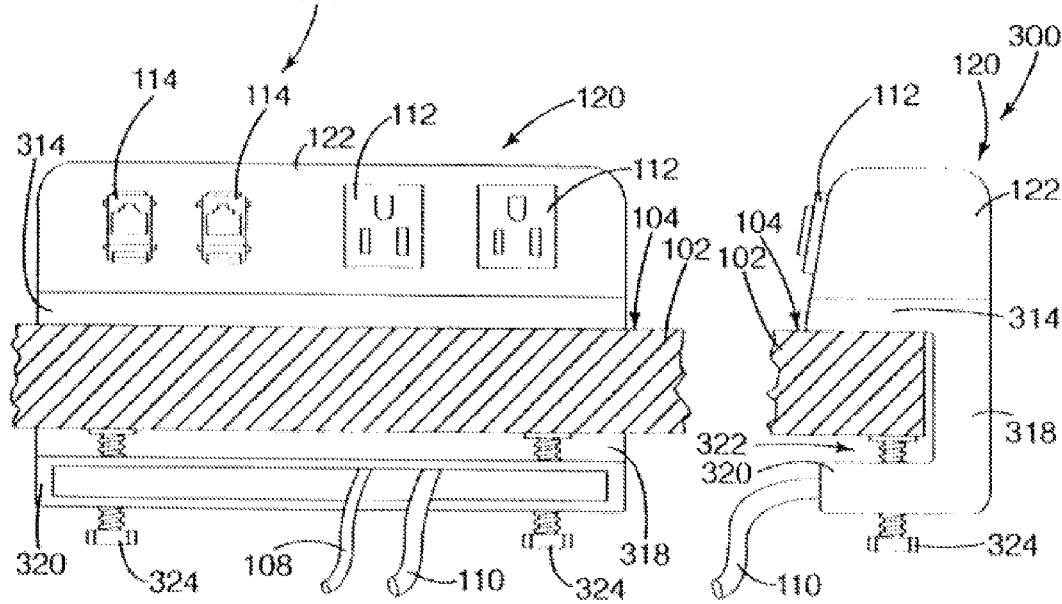
FIG. 10 is a front elevational view of the energy center and work surface shown in FIG. 9.
Figure 11:
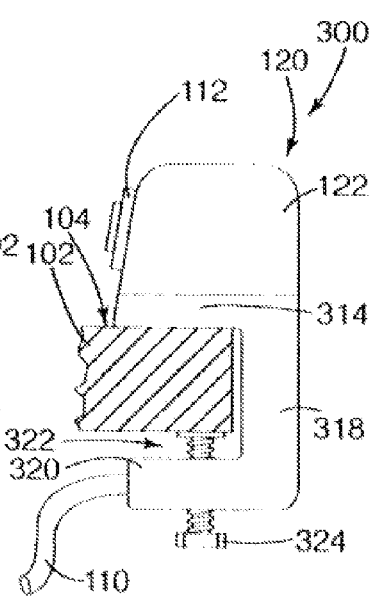
FIG. 11 is a side elevational view of the energy center and work surface shown in FIG. 9.

With reference primarily to FIGS. 1-3 and 8, the energy center 100 includes an energy center upper housing 120 comprising an outer shell 122. As shown in FIG. 8, the upper housing 120 includes an interior spacial area 124 for housing the appropriate electrical wires and portions of the electrical receptacles 112 and data ports 114 which are necessary for purposes of providing energy through the power cords 110 and data lines 108. The power cords 110 and data lines 108 access the spacial area 124 through an open slot area 126.

Figure 3:
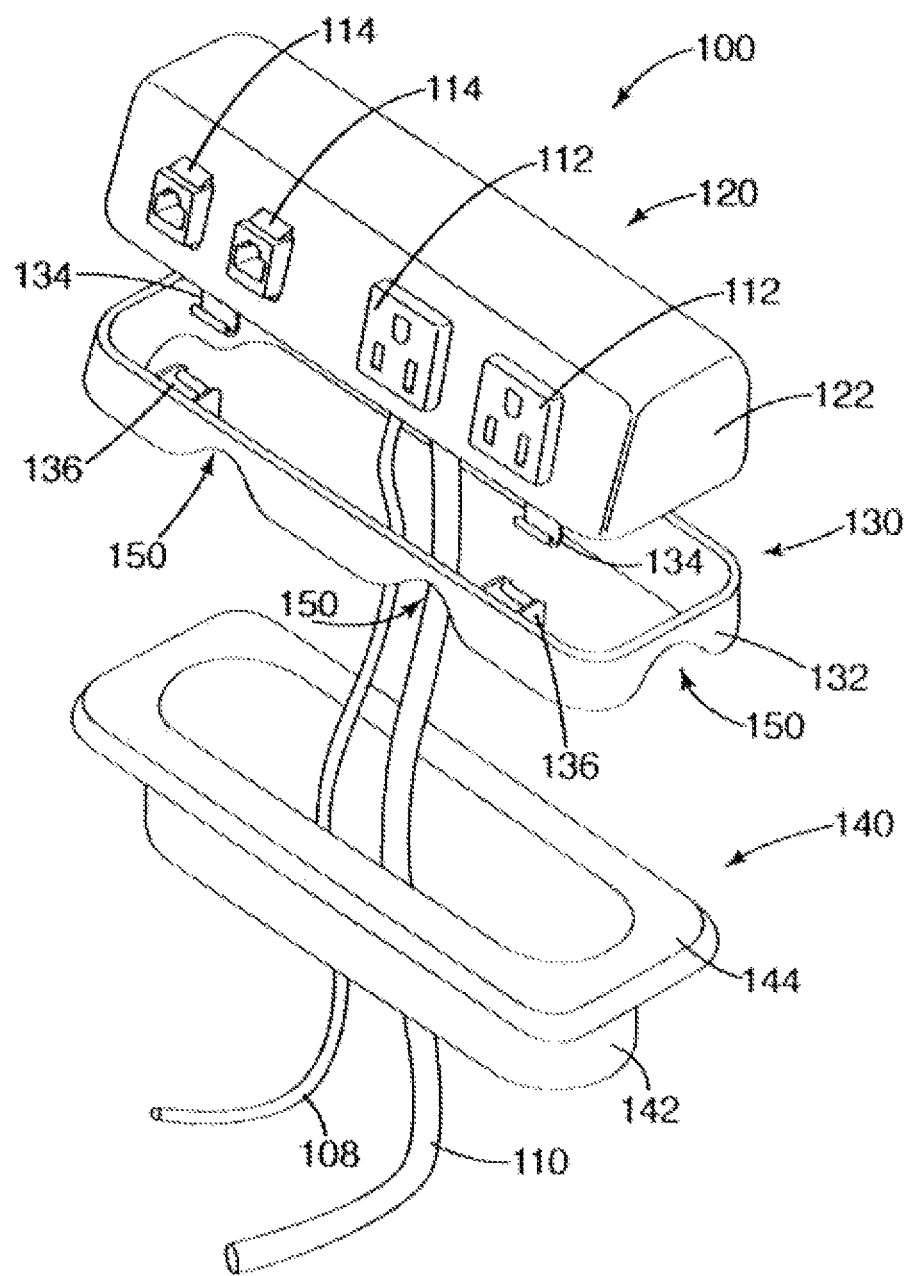
FIG. 3 is a further exploded view of the energy center illustrated in FIG. 1, showing the separate components comprising the energy center upper housing, the base support and the work surface grommet housing.
Figure 4:
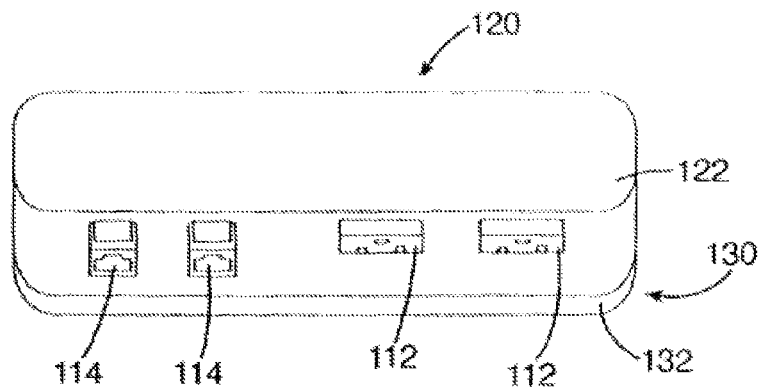
FIG. 4 is a plan view of the energy center upper housing.
Figure 5:
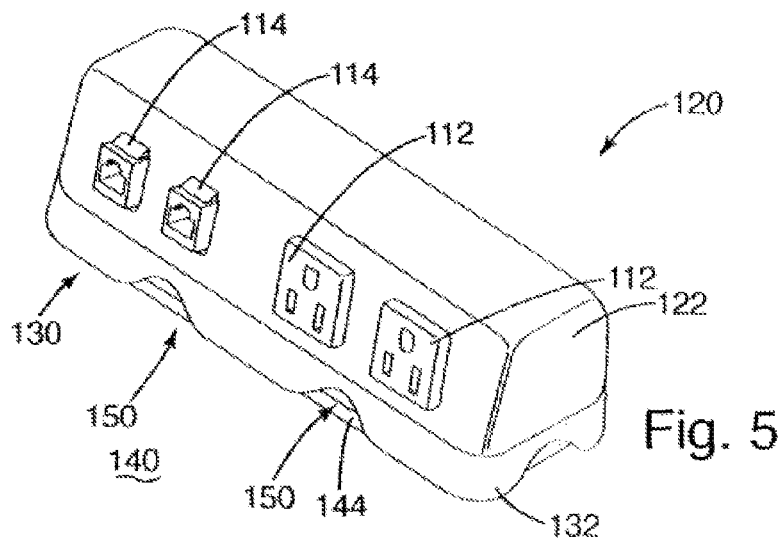
FIG. 5 is a perspective view of the energy center upper housing.
Figure 6:
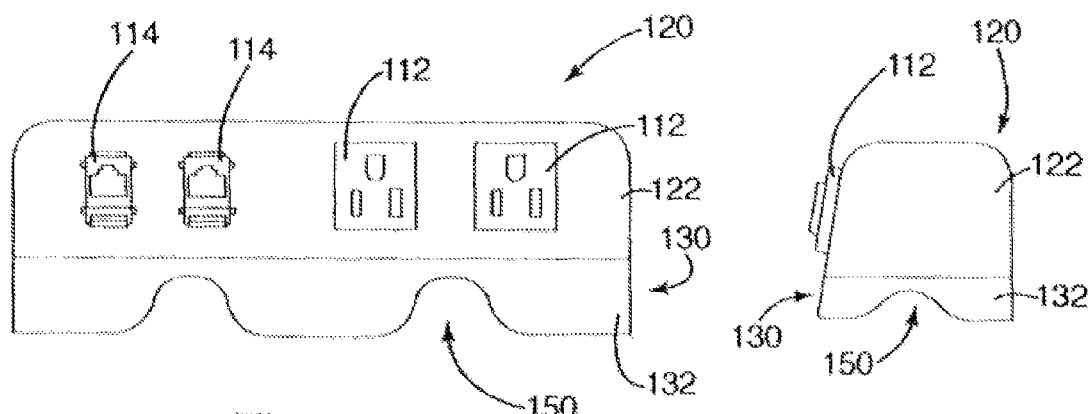
FIG. 6 is a front elevational view of the energy center upper housing.
Figure 7:
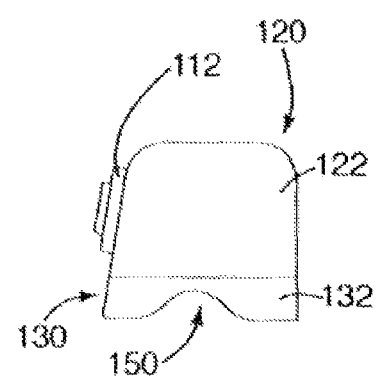
FIG. 7 is a side view of the energy center upper housing.

The energy center upper housing 120 is adapted to be mounted to a particular one of several base supports, such as the base support 130 primarily shown in FIG. 3. The base support 130 comprises a substantially rectangular shell portion 132 which is adapted to be releasably mounted to the energy center upper housing 120. The releasable mounting is provided through releasable connecting means such as the hooks 134 which are mounted to the lower frontal portion of the outer shell 122 of the energy center upper housing 120. The hooks 134 are adapted to be releasably secured to the hook retainers 136. The hook retainers 136 are mounted to the interior surface of a front portion of the shell 132 of the base support 130. It should be emphasized that many different kinds of connecting means can be utilized for purposes of releasably securing the energy center upper housing 120 to the base support 130. The hooks 134 and hook retainers 136 are merely an example of one type of connecting arrangement.

For purposes of providing an aesthetic and convenient means of extending the power cords 110 and data lines 108 up through the work surface 102, the slot 106 can be utilized with a grommet structure, such as the grommet structure 140 primarily illustrated in FIG. 3. The grommet structure 140 can be essentially shaped as illustrated in FIG. 3, and includes a vertically disposed casing structure 142, with the casing 142 extending downwardly into the slot 106 and forming the outer perimeter thereof.

Mounted to the upper edge of the casing portion 142, and potentially integral therewith, is a horizontally disposed collar 144. The horizontally disposed collar 144 has somewhat of a substantially rectangular configuration as primarily shown in FIG. 3. The slot 106 formed in the work surface 102 is configured to be somewhat slightly larger than the inner area formed by the casing 142. Accordingly, when the grommet structure 140 is mounted within the slot 106, the casing 142 is positioned below the planar surface 104. Correspondingly, the outer perimeter of the collar 144 overhangs the slot 106 so as to be positioned above the planar surface 104, with the lower surface of the collar 144 substantially flush with the planar surface 104. In this manner, the collar 144 provides a supporting surface for the grommet 140.

If desired, the grommet 140 can be rigidly secured to the work surface 102. Such arrangements are shown in the previously described and commonly owned U.S. Patents to Byrne U.S. Pat. Nos. 4,747,788 and 5,351,173.

If desired, the base support 130 of the energy center 100 can also be secured, either to the planar surface 104 or to the grommet 140. Specific securing arrangements are not illustrated in the drawings. Alternatively, it is also possible merely to position the energy center 100 over the slot 106 and grommet 140. In this manner, if desired, the energy center 100 can be selectively positioned over various other slots and grommets which may be positioned within the work surface 102.

It should be noted that with the particular energy center 100, comprising the upper housing 120 and the base support 130, the power cords 100 and data lines 108 are substantially hidden from view during use of the energy center. However, slots 150 may also be formed in the base support 130, and provide a means for extending power cords 110 and data lines 108 from atop the planar surface 104. The energy center 100 provides an aesthetically pleasing and functional energy center for use on a planar surface 104 of a work surface 102, without requiring substantial effort in moving the energy center 100 to other locations on the work surface 102, or otherwise connecting and disconnecting power cords and data lines associated with the same.

To illustrate a basic principle with respect to the interchangeability of base supports for the energy center, a second embodiment of an energy center is shown by the energy center 300 illustrated in FIGS. 9-17. For purposes of description, components of the energy center 300 identical to components of the energy center 100 will be referenced with like numerals.

As with the energy center 100 previously described with respect to FIGS. 1-8, the energy center 300 is adapted to be utilized with a work surface 102 having a planar surface 104. However, unlike the previously described energy center 100 with the base support 130, the energy center 300 is adapted to be mounted to an edge or end of the work surface 102, as particularly shown in FIGS. 9 and 11. Also, as with the energy center 100, the energy center 300 includes an energy center upper housing 120 having an outer shell 122. The energy center upper housing 120 mounts electrical receptacles 112 and data ports 114 in a conventional manner. The electrical receptacles 112 are electrically interconnected to the power cord 110, while the data ports 114 are connected for communications with the data line 108.

Figure 12:
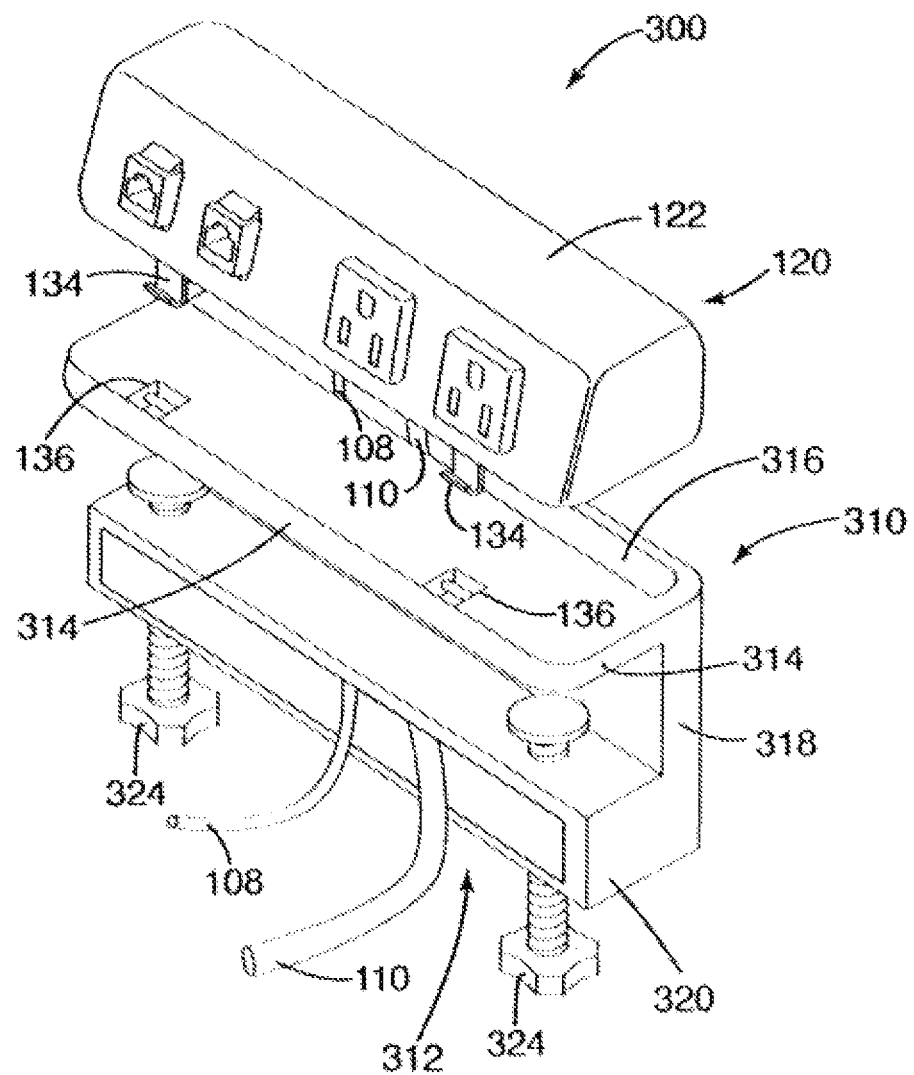
FIG. 12 is an exploded view of the energy center shown in FIG. 9, and illustrating the separate components comprising the energy center upper housing and the base support.
Figure 13:
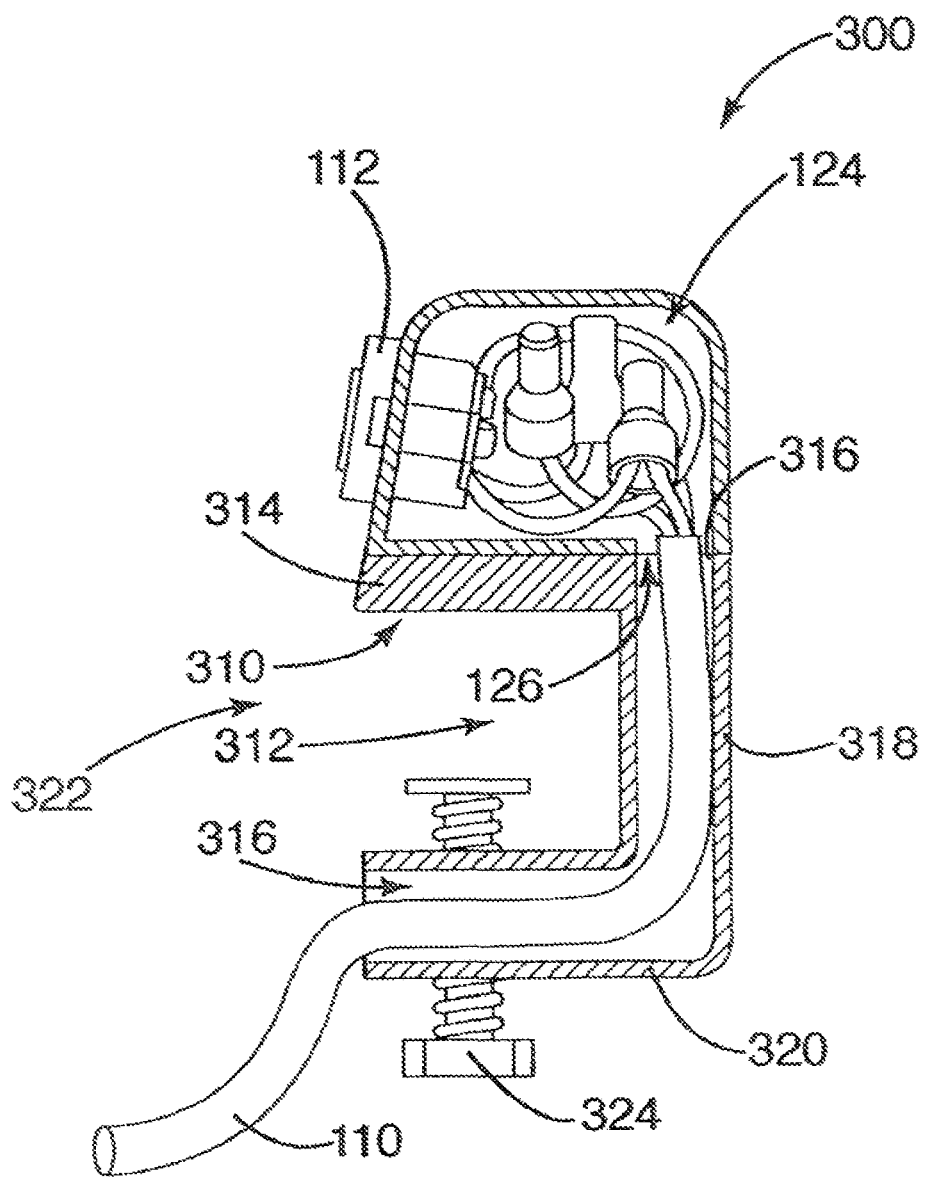
FIG. 13 is a sectional side view of the energy center of FIG. 9, taken along section lines 13-13 of FIG. 15.
Figure 14:
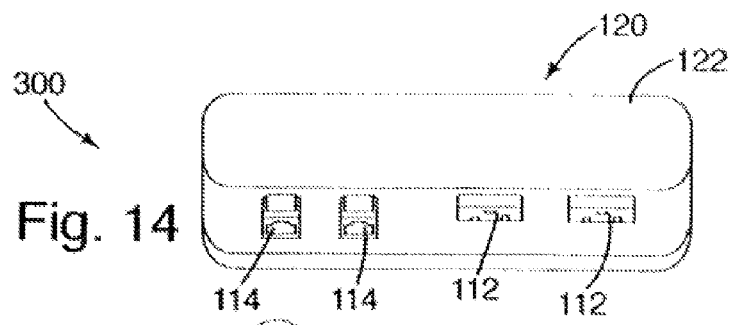
FIG. 14 is a plan view of the energy center shown in FIG. 9.
Figure 15:
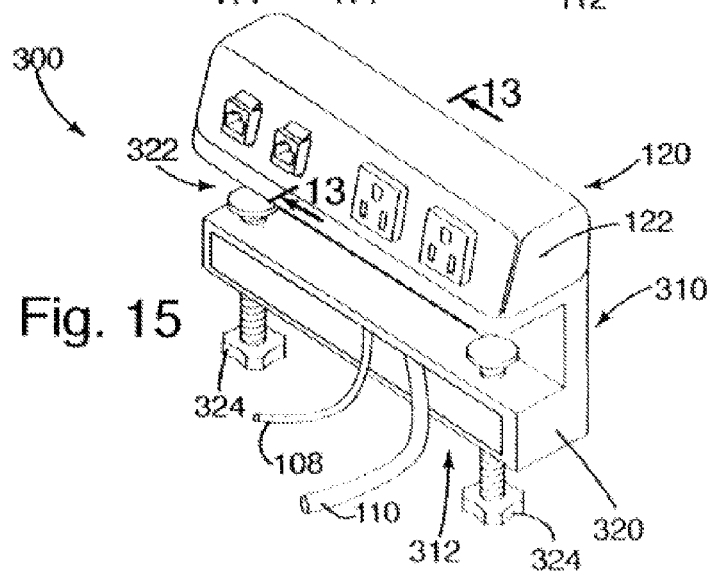
FIG. 15 is a perspective view of the energy center shown in FIG. 9.
Figures 16, 17:
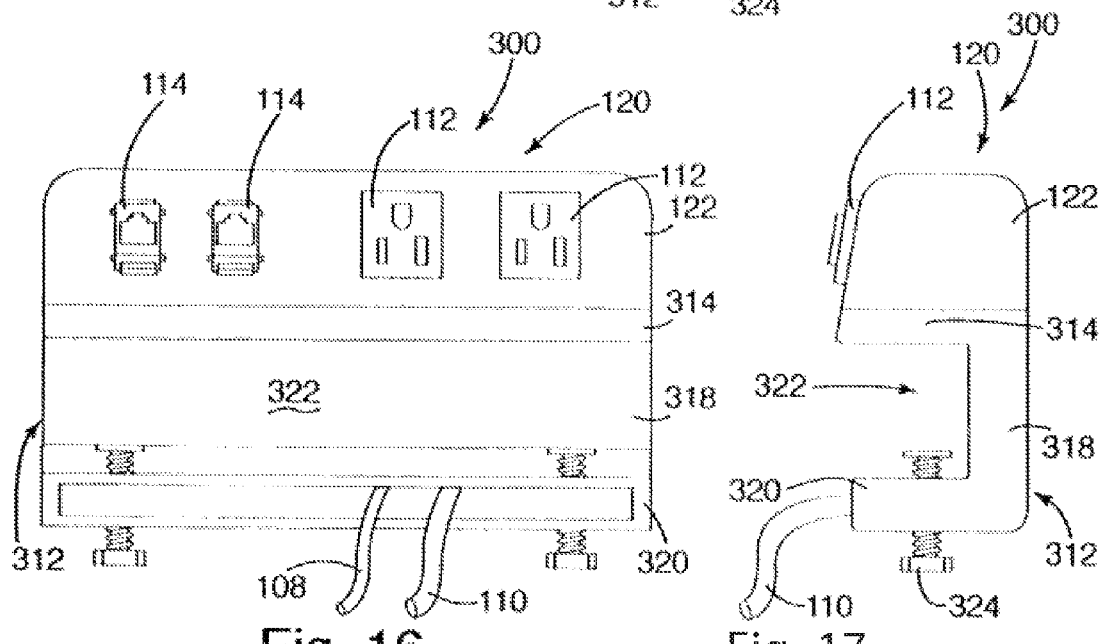
FIG. 16 is a front elevational view of the energy center shown in FIG. 9.
FIG. 17 is a side elevational view of the energy center shown in FIG. 9.

With reference to several of the drawings, but primarily FIGS. 12 and 13, the energy center 300, unlike the energy center 100, includes a second base support 310 which is in the form of a clamping device 312 utilized for purposes of releasably securing the energy center 300 to an edge of the work surface 102. More specifically, the energy center upper housing 120, as with the energy center 100, includes a pair of hooks 134 which are adapted to be releasably secured to hook retainers 136 mounted within the clamping device 312. As with the energy center 100, the hooks 134 and hook retainers 136 provide a means for releasably securing the energy center upper housing 120 to the base support comprising the clamping device 312.

The hook retainers 136 are located within a portion of the clamping device 312 comprising an upper cantilever section 314. The cantilever section 314 comprises an upper planar section having a slot 316 through which the power cords 110 and data lines 108 may extend. The slot 316 is formed at the rear portion of the clamping device 312 and upper cantilever section 314, and opens into the spacial area 124 and aperture portion 126.

The upper cantilever section 314 is connected to or preferably integral with an interconnecting vertical portion 318 extending downwardly from the cantilever section 314. The slot 316 extends through the interconnecting section 318. Connected to or otherwise preferably integral with the lower portion of the interconnecting section 318 is a lower clamp section 320 which extends forwardly from the interconnecting section 318. The lower clamping section 320, interconnecting section 318 and upper cantilever section 314, form a slot 322 which opens forwardly. The slot 322 is appropriately configured and sized so that it is adapted to receive an edge of the work surface 102 as illustrated primarily in FIGS. 9, 10, and 11. For purposes of releasably securing the clamping device 312 to the work surface 102, appropriate clamping screws 324 may be employed.

Also of interest and importance is the positioning of the power cords 110 and data lines 108 through the clamping device 312. As primarily shown in FIG. 13, the slot 316 extends not only through the interconnecting section 318, but also extends in a horizontal manner and forwardly through the lower clamping section 320. In this manner, the power cords 110 and data lines 108 can still be brought forwardly so as to be positioned below the work surface 102, rather than being extended downwardly but out from under the protective area of the work surface 102. However, other types of slotting and guidance arrangements for the power cords 110 and data lines 108 can be utilized.

Turning now to the present invention, the principles of the invention are disclosed, by way of example, in first and second example embodiments of liquid warming grommet assemblies 400 and 500, respectively, as illustrated in FIGS. 18-33. In accordance with the invention, the grommet assemblies 400, 500 provide means for maintaining coffee, hot water and other liquids (or other materials) at a desired, raised temperature through the use of a heating element mountable to a work surface or similar structure. The grommet assemblies 400, 500 in accordance with the invention are recessed, in a manner so that they can be substantially flush with the work surface, and do not take up any substantial volume on the work surface.

Figure 18:
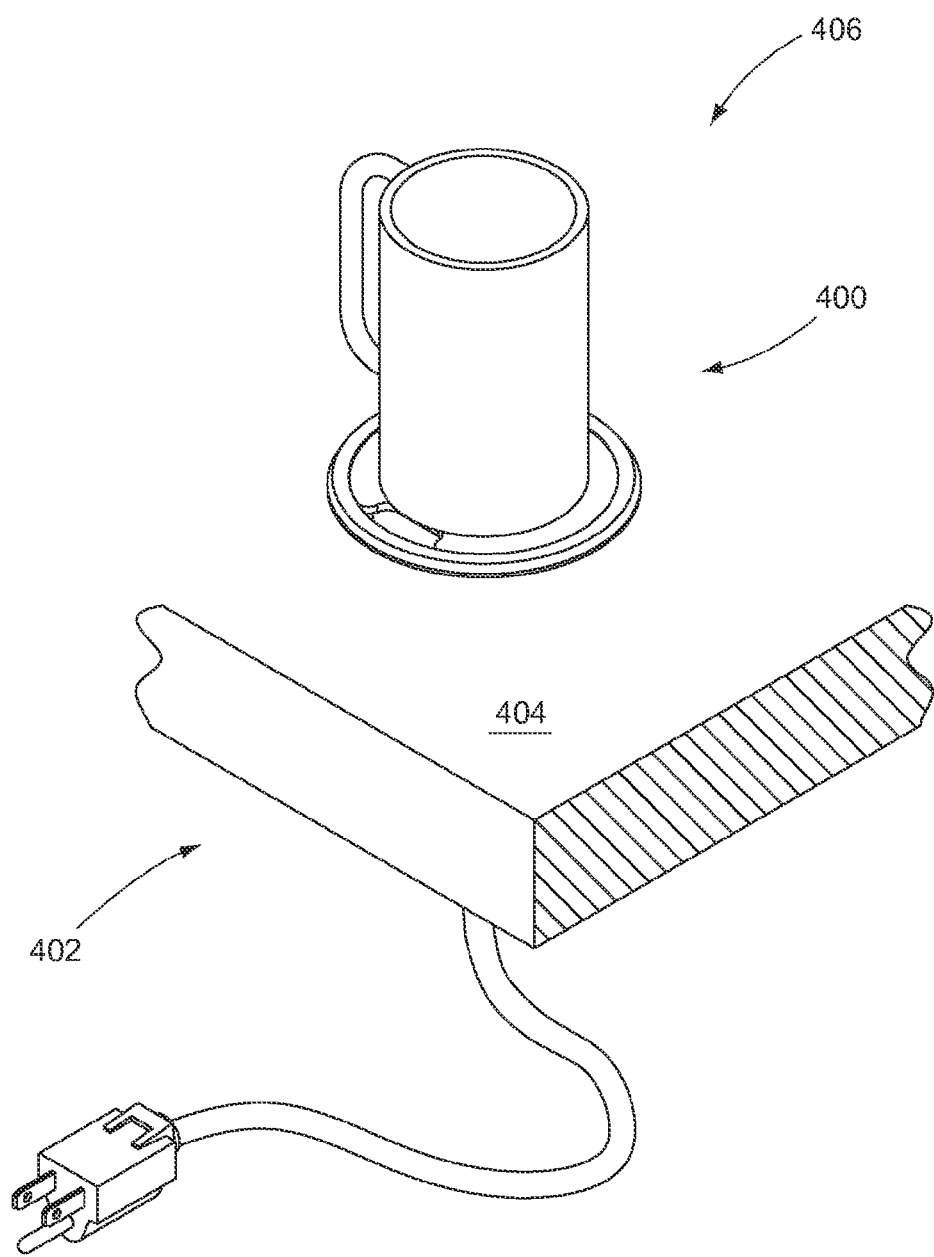
FIG. 18 is a perspective view of a liquid warmer grommet assembly in accordance with the invention, as assembled into a conventional work surface.

More specifically, FIG. 18 illustrates the first embodiment of the liquid warmer grommet assembly 400 in accordance with the invention. The grommet assembly 400 is shown as being mounted within a work table or other furniture item 402 having an upper work surface 404 (the work table 402 and upper work surface 404 being shown in a partial, cut out configuration). The grommet assembly 400 is further shown in FIG. 18 as supporting a coffee cup or vessel 406 which may be filled with various types of liquids or other materials which the user wishes to maintain at a desired, raised temperature.

Figure 20:
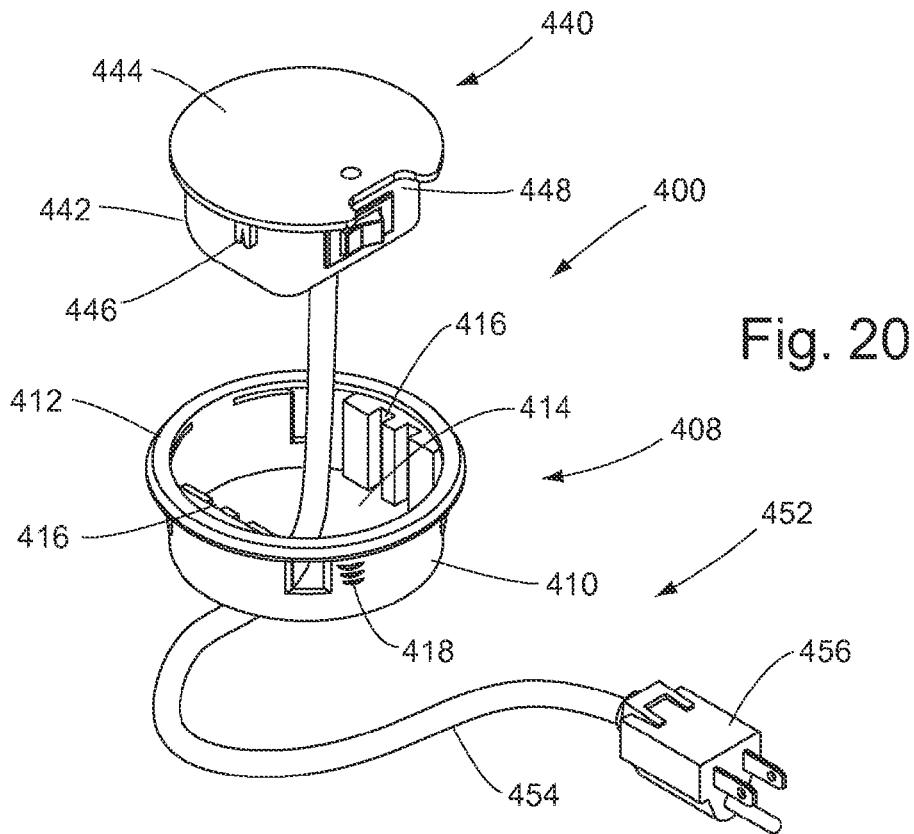
FIG. 20 is a perspective and partially exploded view of the warmer grommet assembly shown in FIG. 19, but with the absence of the latching cams.

Turning to FIG. 20, the liquid warmer grommet assembly 400 is illustrated in a partially exploded and stand-alone configuration. As shown therein, the liquid warmer grommet assembly 400 comprises a grommet 408 which is adapted to be mounted within an aperture cut into and through the upper work surface 404. The grommet 408 includes a lower, cylindrical casing 410. Mounted to or otherwise integral with the upper edge of the casing 410 is a horizontally disposed upper collar 412. The collar 412 has a cylindrical configuration, and is concentric with the casing 410.

Although not specifically shown in FIG. 18 or the other drawings, the work table 402 and upper work surface 404 can have a cylindrical slot or aperture formed therein. The slot or aperture can have a diameter which is just slightly larger than the outer diameter of the cylindrical casing 410. In use, the grommet 408 is inserted into the slot so that the cylindrical casing 410 is positioned below the upper work surface 404 of the work table 402. Correspondingly, the upper collar 412 is configured so that its outer diameter is slightly larger than the diameter of the slot. Accordingly, when the cylindrical casing 410 is inserted into the slot, the outer parameter of the upper collar 412 overhangs the slot, so as to positioned above the work surface 404, with the lower surface of the collar 412 substantially flush with the upper support surface 404. In this manner, the collar 412 provides a supporting surface for the grommet 408.

The cylindrical casing 410 and upper collar 412 form what could be characterized as a housing interior 414 within the casing 410. As further shown in FIGS. 20 and 28, the housing interior 414 includes a pair of opposing alignment slots 416. As will be described in subsequent paragraphs herein, the alignment slots 416 are utilized to couple the heating element to the grommet 408 in an appropriate alignment. Still further, and as shown primarily in FIGS. 20 and 29, the outer surface of the cylindrical casing 410 includes sets of press-fit ribs 418. The use of press-fit ribs is well known in the office furniture and electrical component industries, and are sized and configured so that when the cylindrical casing 410 is inserted into the slot (not shown) of the work table 402 and upper work surface 404, the ribs 418 will provide for a friction fit with the inner surface of the slot.

In addition to the grommet 408, the warmer grommet assembly 400 includes a heating element 440. The heating element 440 is primarily shown in FIGS. 20 and 21-27. With reference thereto, the heating element 440 includes an element housing 442. When assembled, the grommet assembly 400 is configured so that the element housing 442 is received within the housing interior 414 of the grommet 408. As primarily shown in FIG. 27, the heating element 440 has a substantially rectangular and "box-like" configuration, with one side being curved. The cross dimensions of the heating element 440 are somewhat smaller than the diameter of the housing interior 414 of the grommet 408. Although not shown in substantial detail, conventional heating elements can be enclosed within the element housing 442. Mounted to the top of the element housing 442 is a warmer plate 444. As shown particularly in FIG. 25, the warmer plate 444 has a substantially circular configuration, with a finger slot 448 "cut out" of a part of the perimeter of the warmer plate 444. The element housing 442 and warmer plate 444 are configured so that when conventional heating elements (not shown) within the element housing 442 are energized, the warmer plate 444 will maintain a temperature which is appropriate for maintaining liquids within the coffee cup 406 at a raised, but "drinkable" temperature. Again, such heating elements are well known in the prior art and are commercially available.

As further shown primarily in FIGS. 24, 26 and 27, mounted on opposing sides of the bottom of the warmer plate 444 are a pair of element ears 446. The element ears have a cross configuration as primarily shown in FIG. 26. The ears 446 are sized so that they can be compressed and receivable within opposing ones of the alignment slots 416 associated with the housing interior 414 of the grommet 408. In this manner, the heating element 440, when inserted into the cylindrical casing 410 of the grommet 408, will be in an appropriate and constant alignment. In addition to the foregoing components, the heating element 440 may also comprise a power switch 450 mounted to one side of the element housing 442. The power switch 450 is primarily shown in FIGS. 20 and 24. Although not shown in any detail, the power switch 450 may preferably have two states, namely an "on" and an "off" state. The power switch 450 may be connected in a conventional manner to electrical elements (not shown) within the element housing 442, positioned below the warmer plate 444. When externally energized, the heating elements within the element housing 442 can be controlled as to enablement or disablement of power through the use of the power switch 450. Further, as apparent from FIGS. 20, 24 and 25, the power switch 450 is located immediately below the finger slot 448. Accordingly, even with the element housing 442 received within the housing and interior 414 of the cylindrical casing 410 when the warmer grommet assembly is completely assembled together, the user still has the capability of accessing the power switch 450 through the finger slot 448.

For purposes of energizing the electrical elements within the element housing 442, power can be supplied to these elements through various means. For example, and as shown in FIGS. 18, 20, 21 and other illustrations, the heating element 440 can be energized through the use of a power cord assembly 452. The power cord assembly 452 can include a conventional power cord 454 carrying electrical wires into the interior of the element housing 442. In a conventional manner, these wires can be connected to the appropriate electrical elements, so as to provide for a heating function. The opposing end of the cord 454 can be connected in a conventional manner to a three-prong or similar plug 456, adapted to be received within a conventional power outlet of an electrical receptacle.

An alternative assembly can include the hard wire assembly 458 primarily illustrated in FIG. 22. The hard wire assembly 458 can include a flexible conduit 460 carrying wires 462. One end of the flexible conduit 460 and the wires 462 is connected into the interior of the element housing 442, and further connected to appropriate electrical elements. The opposing end of the conduit 460 may be opened, so as to expose the wires 462. These wires may be connected to any of a number of various components for providing electrical power. For example, such wires 462 could be connected directly to a conventional junction box or the like.

A still further assembly configuration is illustrated in FIG. 23, and is referred to herein as a connector assembly 464. The connector assembly 464 can include the flexible conduit 460 utilized with the hard wire assembly 458. However, instead of exposed wires extending outwardly from an open end of the conduit 460, the connector assembly 464 includes a multi-port connector 466 connected to a distal end of the flexible conduit 460. The connector 466 may be any one of a number of known multi-port or multi-circuit connectors.

Figure 19:
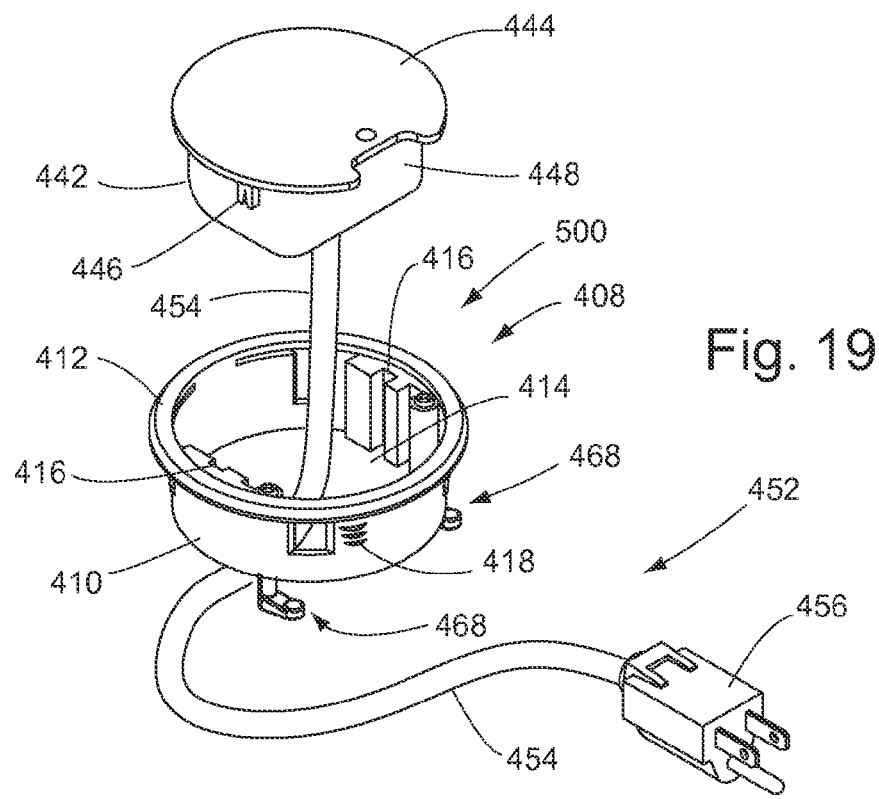
FIG. 19 is a perspective and partially exploded view of the grommet assembly shown in FIG. 18, expressly showing the use of latching cams with a grommet and warming plate assembly.
Figure 28:
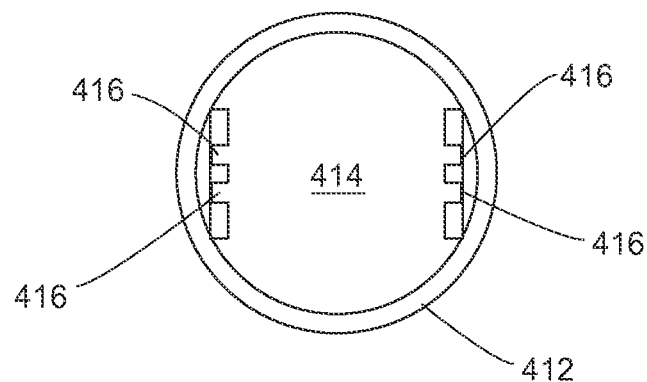
FIG. 28 is a top, plan view of a grommet in accordance with the invention, having a press fit configuration.
Figure 29:
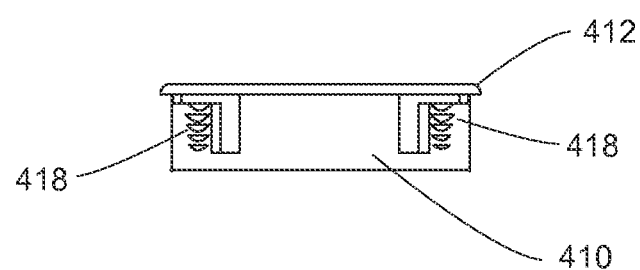
FIG. 29 is a side, elevation view of the grommet shown in FIG. 28.
Figure 30:
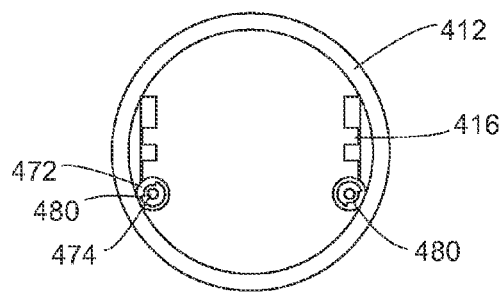
FIG. 30 is a top, plan view of a grommet in accordance with the invention, showing a configuration employing the latching cams.
Figure 32:
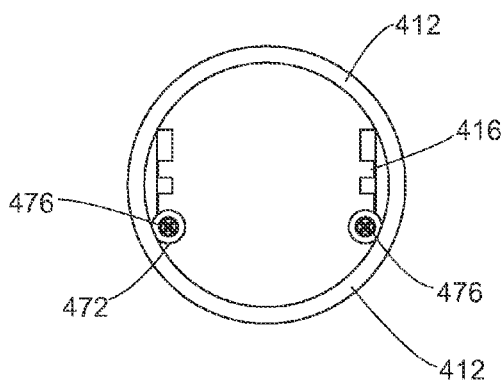
FIG. 32 is a top, plan view of the grommet shown in FIG. 30, but with the connecting screws in a fully assembled state.
Figure 31:
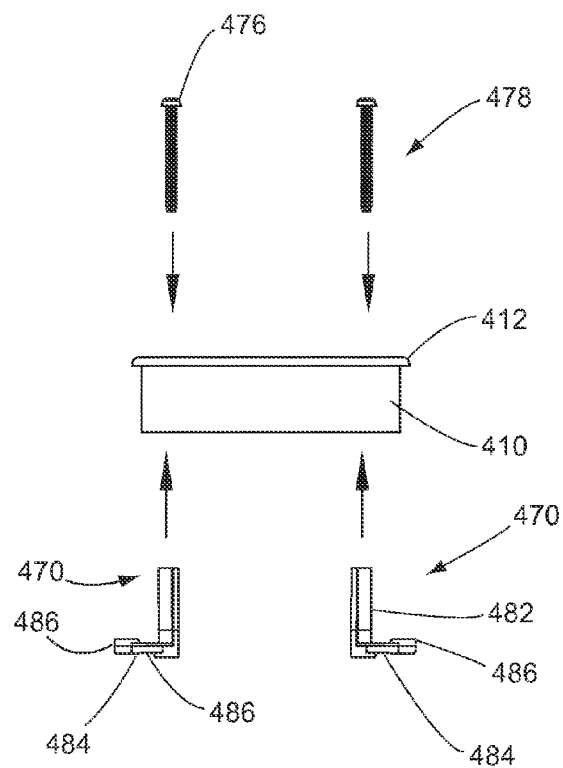
FIG. 31 is a front, elevation and partially exploded view showing the latching cams and connecting screws for the grommet shown in FIG. 30.
Figure 33:
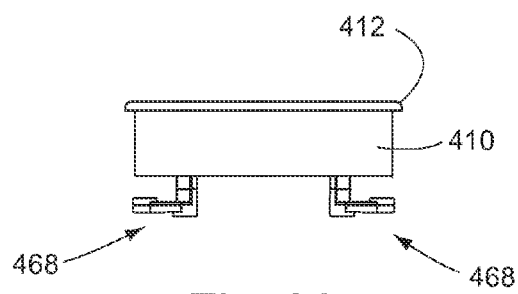
FIG. 33 is a front, elevation view of the grommet shown in FIG. 32, with the latching cams in a fully assembled state.
Figure 34:
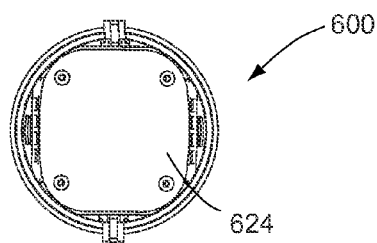
FIG. 34 is an underside view of a further embodiment of a grommet assembly in accordance with the invention, with the grommet assembly having the capability of providing both heating and cooling functions.

In addition to the warmer grommet assembly 400, the disclosure herein also includes a second embodiment of a grommet assembly in accordance with the invention, referred to herein as liquid warmer grommet assembly 500, as illustrated in FIG. 19. The warmer grommet assembly 500 is substantially identical to the warmer grommet assembly 400, with the exception that the warmer grommet assembly 500 includes what can be characterized as a pair of latching cam assemblies 468. Because other components of the warmer grommet assembly 500 are substantially identical to those of the warmer grommet assembly 400, such elements will not be described in any detail herein. Primarily, the latching cam assemblies 468 are illustrated in FIGS. 19 and 30-33. With reference thereto, the latching cam assemblies 468 are utilized to removably secure the grommet 408 of the grommet assembly 500 to the work surface 404 and work table 402. More specifically, and with reference primarily to FIGS. 30-33, each of the latching cam assemblies 468 includes a cylindrical bushing 472 which is vertically oriented and integrally coupled with or otherwise secured to the inner surface of the cylindrical casing 410, as shown in FIGS. 30 and 32. For purposes of brevity, the structural configuration of only one of the latching cam assemblies 468 will be described, it being understood that the configuration of the other latching cam assembly 468 is substantially identical.

Within each of the bushings 472 is a vertically disposed cylindrical aperture 474. The cylindrical aperture 474 includes a first cylindrical portion (not shown) having a diameter sufficient so as to receive the head 476 of a threaded screw 478, in a counter-sunk configuration. That is, the longitudinal length of the first cylindrical portion allows for the threaded screw 478 to be positioned so that the head 476 is below the top of the bushing 472 when the threaded screw 478 is assembled with the cam assembly 468. The cylindrical aperture 474 further includes a second cylindrical portion (not shown). At the lower portion of the cylindrical aperture 474, the aperture 474 includes a third substantially cylindrical portion (not shown), with a diameter substantially larger than the diameter of the threaded second cylindrical portion (not shown). The inner surface of the cylindrical bushing 472 includes an arcuate-shaped detent 480 which acts so as to essentially narrow the diameter of the third substantially cylindrical portion (not shown) within an arc of the maximum, circular cross-sectional area of the third cylindrical portion.

The latching cam assembly 468 further includes a cam element 470 having an upstanding sleeve portion 482 and a horizontally disposed foot 484 integrally formed with or otherwise secured to the lower end of the upstanding sleeve portion 482. The upstanding sleeve portion 482 can be formed as a substantially cylindrical portion having an arcuate-shaped sill. The sill may preferably be integrally formed with the substantially cylindrical portion of the upstanding sleeve portion 482. The arcuate-shaped sill is adapted to abut the arcuate-shaped detent 480 of the cylindrical bushing 472 when the cylindrical casing 410 is secured to the work surface 404. A threaded aperture may extend at least partially through the upstanding sleeve portion 482. The threaded aperture is adapted to threadably receive the threaded screw 478. The foot 484 includes a leg 486 extending from the underside of the upstanding sleeve portion 482. A boss 488 projects upwardly from the distal section of the leg 486.

The operation of the latching cam assemblies 468 in removably securing the cylindrical casing 410 to the work surface 404 will now be described. Each of the latching cam assemblies 468 is first inserted from the underside of the cylindrical casing 410 into a corresponding one of the bushings 472. More specifically, the upstanding sleeve portion 482 is inserted into the third substantially cylindrical portion, so that the substantially cylindrical portion and arcuate-shaped sill are received within the third substantially cylindrical portion. The relative sizes of the bushings and the cam assemblies 468 are such that the sills of the upstanding sleeve portions 482 are positioned relative to the detents 480 of the bushings 472 so as to appropriately cooperate with the same to allow insertion of the substantially cylindrical portions and sills into the third substantially cylindrical portion of the bushings 472. The connecting screws 478 are then inserted into the first cylindrical portions of the bushings 472 from above the cylindrical casing 410, and threadably secured within the threaded apertures 474 of the upstanding sleeve portions 482.

For purposes of inserting the cylindrical casing 410 and the latching cam assemblies 468 into the slot within the work surface 404, the latching cam assemblies 468 are first positioned with the feet 484 in a manner such that the legs 486 extend parallel to the walls of the cylindrical casing 410. For this configuration, the detents 480 and the arcuate-shaped sills must be of a relative configuration to allow the specific positioning of the legs 486.

With this configuration, the cylindrical casing 410 can be inserted into the slot of the work surface 404. After such insertion, the connecting screws 478 can each be turned clockwise. As the connecting screws 478 are turned clockwise, they will rotate the substantially cylindrical portion of the upstanding sleeve portions 482. With this clockwise rotation, the cylindrical portions will continue to rotate until the sills abut one side of the corresponding detent 480 of the bushing 472. This abutment will then prevent any further clockwise and simultaneous rotational movement of the threaded screw 478 and sleeve portion 482, relative to the corresponding bushing 472. With this clockwise rotation, the feet 484 will correspondingly rotate in a clockwise position. When the detents 480 abut the sills, further rotational movement of the sleeve portions 482 and legs 486 is prevented. Also, in this position, the bosses 488 are located immediately beneath an underside of the work surface 404. Continued rotation of the connecting screws 478 will thereby cause upward movement of the upstanding sleeve portions 482 within the bushings 472. This upward movement will continue until the bosses 488 securely engage the underside portion of the work surface 404. In this manner, the cylindrical casing 410 can be readily secured within the slot of the work surface 404. Disassembly essentially requires counterclockwise rotation of the threaded screws 478. Concepts associated with latching cam assemblies for use with work surface mounted devices are disclosed in the commonly owned U.S. Patent to Byrne U.S. Pat. No. 6,290,518 issued Sep. 18, 2001.

Before specifically describing the grommet assemblies 600, 700 and 800 in accordance with the invention, certain background will be set forth with regard to known concepts with respect to certain types of devices having the capability of selectively heating or cooling liquids or other materials within a cup or other holding devices. As described in the section entitled "Background of the Invention," many known devices for heating and cooling are relatively bulky, expensive and impractical. Certain advances have been made with respect to the capability of providing heating and cooling functions within relatively small units, and in ways which are not substantially expensive, bulky or otherwise impractical. As an example, one organization which has developed a number of concepts associated with small units having the capability of heating and cooling is Tellurex Corporation of Traverse City, Mich. Certain of these units take advantage of the principles of thermoelectrics. The subsequent description herein with respect to thermoelectrics is known in the art and is being provided herein substantially for purposes of background.

With respect to thermoelectric principles, it has been known for a substantial period of time that if a temperature gradient is placed across junctions of two dissimilar conductors, electrical current will flow. Correspondingly, passing current through two dissimilar electrical conductors will cause heat to be either emitted or absorbed at the junction of the materials. Although these principles have been well known for a substantial period of time, they have not resulted in any practical applications until advances during the 20th Century in semiconductor technology. With these advances, thermoelectric devices became feasible to produce. Accordingly, thermoelectric "modules" have been developed which can deliver relatively efficient solid state heat-pumping for both cooling and heating.

In this regard, a thermoelectric module can be developed which consists of an array of semiconductor pellets that have been "doped" so that one type of charge carrier (either positive or negative) carries the majority of current. These pairs of "P/N" pellets can be configured so that they can be connected electrically in series, and thermally in parallel. Metalized ceramic substrates can provide a platform for the pellets and small conductive tabs for connecting the pellets. The pellets, tabs and substrates can thus be formed in a layered configuration. Such thermoelectric modules can function singularly or in groups, with either series, parallel or series/parallel electrical connections.

With the module constructed as previously described, and when, for example, DC voltage is applied to the module, the positive and negative charge carriers in the pellet array absorb heat energy from one substrate surface and release it to the substrate at the opposite side. The surface where heat energy is absorbed becomes cold. Correspondingly, the opposite surface where heat energy is released becomes hot. In this regard, the flow of heat within the charge carriers in a thermoelectric device is somewhat similar to the way that compressed, refrigerant transfers heat in a mechanical system. That is, the circulating fluids in a compressor system carry heat from the thermal load to the evaporator, where the heat is dissipated. With thermoelectric technology, however, the circulating direct current carries heat from the thermal load to some type of a heat sink, which can effectively discharge the heat into the outside environment.

With these concepts in mind, a thermoelectric cooling assembly could readily be developed with several components. Namely, the assembly could include a cold plate, preferably surrounded by insulating foam. A fan could be provided so as to assist in exhausting air through heat sink fins or the like. The assembly could also include an air intake running through the fan. With low voltage DC power (e.g. 12 vdc) applied to the device, heat can be absorbed so that the cold plate will cool (or maintain coolness) of objects placed on the cold plate. Correspondingly, it should be noted that the function of heating or cooling will actually depend on the direction of DC power and DC current applied to the assembly. Again, such devices are manufactured and are commercially available through the Tellurex Corporation.

Figure 45:
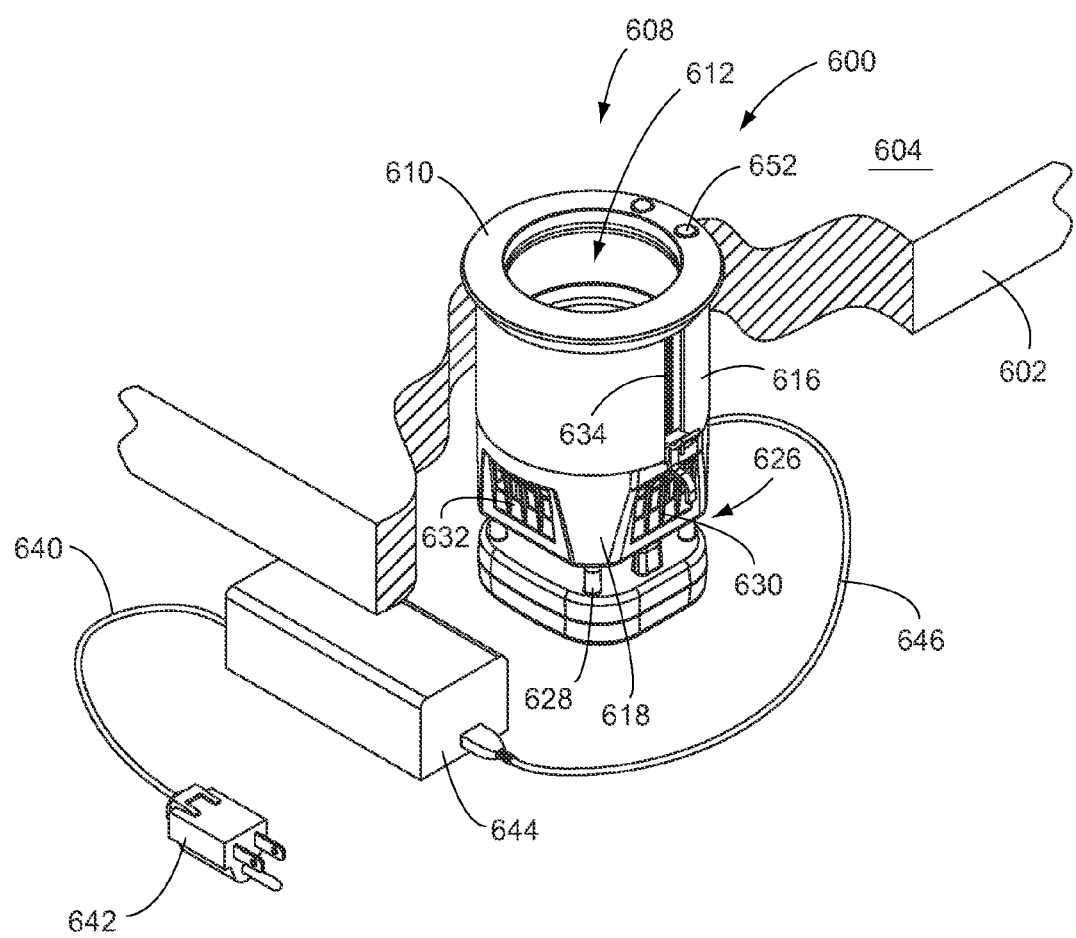
FIG. 45 is a perspective view similar to FIG. 44, but showing the work surface in a cut away configuration.
Figure 46:
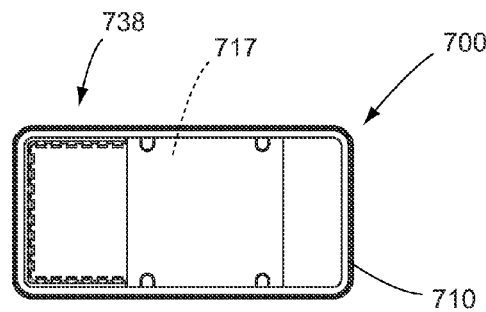
FIG. 46 is an underside view of a still further embodiment of a hot/cold grommet assembly in accordance with the invention, with the grommet assembly having relatively less depth and with the power unit portion of the grommet assembly being adjacent to the cup holding portion of the assembly.
Figure 47:
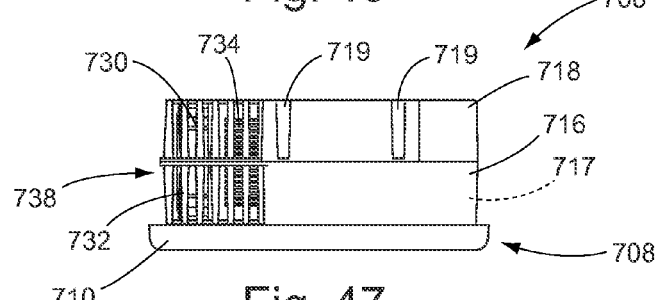
FIG. 47 is an upside down elevation view of the grommet assembly shown in FIG. 46.
Figure 48:
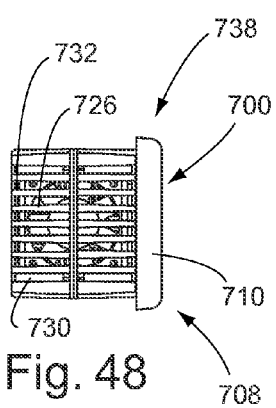
FIG. 48 is a left side view of the grommet assembly shown in FIG. 46.
Figure 49:
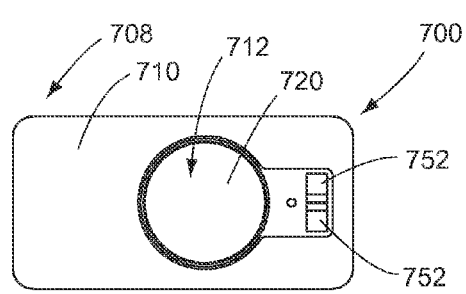
FIG. 49 is a top, plan view of the grommet assembly shown in FIG. 46.
Figure 50:
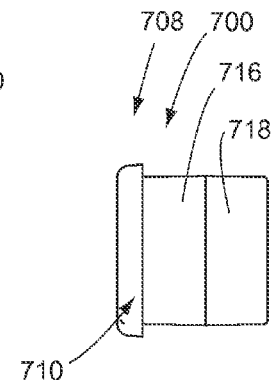
FIG. 50 is a right side view of the grommet assembly shown in FIG. 46.
Figure 51:
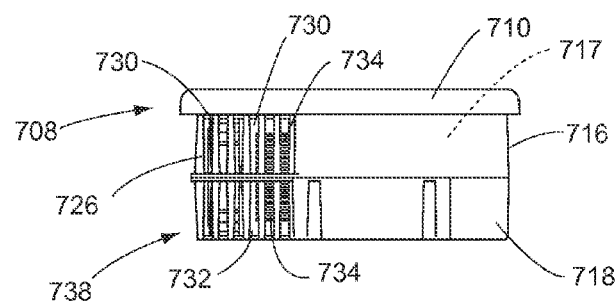
FIG. 51 is a front elevation view of the grommet assembly shown in FIG. 46.

Turning now to further embodiments of the invention which incorporate the use not only of liquid warming assemblies, but also heating/cooling grommet assemblies, a hot/cold grommet assembly 600 will now be described with respect to FIGS. 34-45. In accordance with the invention, the grommet assembly 600 includes means for maintaining coffee, hot water and other liquids (or other materials) at a desired, raised temperature, through the use of a heating element mountable to a work surface or similar structure. Further in accordance with the invention, the hot/cold grommet assembly 600 may also include means for maintaining cola, water, iced tea and other liquids (or other materials) at a desired, lowered temperature below ambient. As earlier described, electronic and thermoelectric components, such as those manufactured and sold by Telleurex Corporation, may be utilized as components of grommet assemblies described herein in accordance with the invention. Turning to FIGS. 34-45, and specifically with reference to FIGS. 40, 41, 44 and 45, the grommet assembly 600 in accordance with the invention may be characterized as a recessed assembly, or a similar type of holding component may be recessed into an element within which the grommet assembly 600 is located. In this manner, the grommet assembly 600 also does not take up any substantial volume on the supporting component. More specifically, and with reference to the aforedescribed drawings, the grommet assembly 600 is shown as being mounted within a work table or other furniture item 602 having an upper work surface 604. FIG. 45 illustrates the work table 602 and work surface 604 in a partial, cut out configuration. In FIGS. 40 and 41, the grommet assembly 600 is further shown as supporting a coffee cup or other type of vessel 606 which may be filled with various types of liquids or other materials. In accordance with one aspect of the invention, the liquid or other material within the cup 606 may be desired by a user to be maintained at a raised temperature above ambient. Alternatively, the user may wish the liquid or other material within the cup or vessel 606 to be maintained at a cooled temperature, below ambient.

The hot/cold grommet assembly 600 is shown in a "stand alone" configuration in FIGS. 34-39, 42 and 43. With reference thereto, the grommet assembly 600 includes a grommet 608 adapted to be mounted within an aperture 612 (FIG. 40) cut into and through the work table 602 and work surface 604 (FIGS. 40, 41). The grommet 608 is adapted to be mounted within an aperture 612 (FIG. 40) cut into and through the work table 602 and work surface 604. The grommet 608 includes a lower, cylindrical casing 614 (FIGS. 35, 36, 38 and 39). Mounted to or otherwise integral with the upper edge of the casing 614 is a horizontally disposed annular collar 610 (FIGS. 35-39 and 42, 43). The annular collar 610 is concentric with the casing 614.

The slot or aperture 612 cut into the work table 602 and work surface 604 can have a diameter which is just slightly larger than the outer diameter of the cylindrical casing 614. In use, the grommet 608 can be inserted into the slot or aperture 612 so that the cylindrical casing 614 is positioned below the work surface 604 of the work table 602. Correspondingly, the annular collar 610 is configured so that its outer diameter is slightly larger than the diameter of the aperture 612. Accordingly, when the cylindrical casing 614 is inserted into the slot, the outer perimeter of the upper annular collar 610 overhangs the aperture 612, so as to be positioned above the work surface 604, with the lower surface of the annular collar 610 substantially flush with the work surface 604. In this manner, the collar 610 provides a supporting surface for the grommet 608.

As further shown in a number of the drawings, including FIGS. 35, 36, 38, 39, 42 and 43, the grommet assembly 600 further includes a cylindrical upper housing 616 which is mounted to or is otherwise integral with the grommet 608 and positioned below the grommet 608. Connected to or otherwise integral with the upper housing 616 is a lower housing 618, having somewhat of a frustrum-shaped configuration as primarily shown in FIGS. 35, 36, 38 and 39. The upper housing 616 and lower housing 618 form an interior 617. Positioned in a recessed configuration below the grommet 608 and within the interior 617 is a hot/cold plate 620, primarily shown in FIG. 37. The hot/cold plate 620 is adapted to be heated or cooled, as desired by the user, so as to maintain the temperature of liquid or other material within the coffee cup 606 at a temperature above or below ambient, respectively. Of course, this occurs when the coffee cup 606 is positioned on an upper surface of the hot/cold plate 620.

Figure 37:
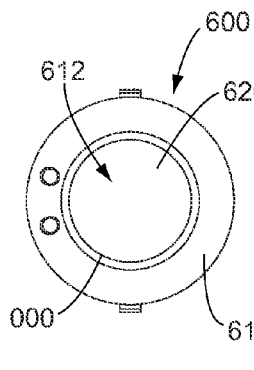
FIG. 37 is a plan view of the grommet assembly shown in FIG. 34.
Figure 38:
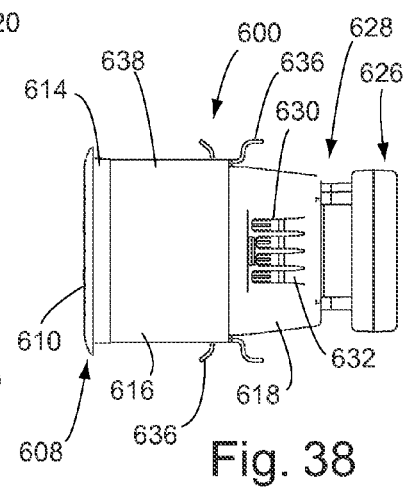
FIG. 38 is a right side view of the grommet assembly shown in FIG. 34.

Positioned around the hot/cold plate 620 and within the interior 617 formed by the upper and lower housings 616, 618, respectively, can be a collar of insulating foam 622 (FIG. 37). The insulating foam 622 can be utilized so as to insulate the plate 620 from other components of the grommet assembly 600.

As shown in FIGS. 34-36 and 38-39, the grommet assembly 600 can also include a bottom plate 624. The bottom plate 624 forms part of a housing for a conventional fan assembly 626. The fan assembly 626 may be utilized to bring in cooled air to the heating/cooling device, so as to provide and facilitate a heat exchanger function. The fan assembly 626 can be separated from other portions of the grommet assembly by a series of vertically disposed conduit pillars 628, as shown primarily in FIGS. 35-36 and 38-39. The conduit pillars 628 serve so as to separate the fan assembly 626 from other components of the grommet assembly 600, as well as provide protected paths for electrical wires or the like which must run to the fan assembly 626 for purposes of electrical operation.

In addition to the foregoing elements, the grommet assembly 600 includes a series of heat sink fins 630 with air exhaust ports 632 formed therebetween. These components consisting of the fins 630, ports 632 and fan assembly 626 provide for a heat exchanger function and for dissipation of heat resulting from operation of the grommet assembly 600.

Figure 35:
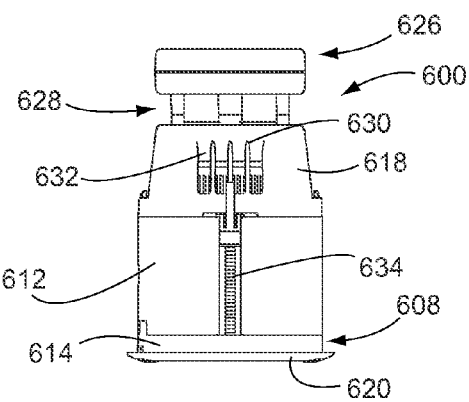
FIG. 35 is an upside down elevation view of the grommet assembly shown in FIG. 34.
Figure 36:
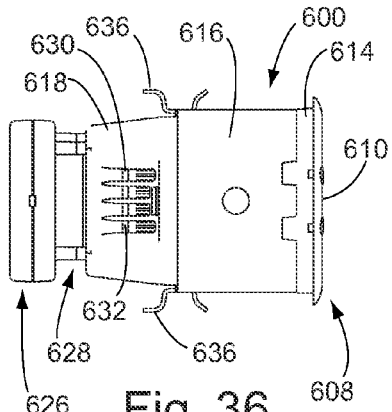
FIG. 36 is a left side elevation view of the grommet assembly shown in FIG. 34.
Figure 39:
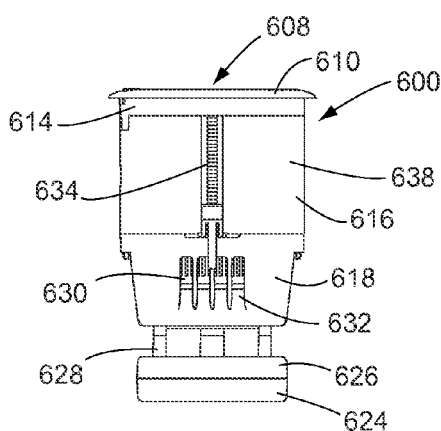
FIG. 39 is a front elevation view of the assembly shown in FIG. 34.

The grommet assembly 600 can be secured to the work table 602 and work surface 604 through various means. For example, FIGS. 35 and 39 show a pair of vertically disposed connecting screws 634 connected to support clips 636. These connecting screws 634 can be adjusted so as to move the support clip 636 into appropriate contact with the work table 602 or other elements associated with the work table 602.

Still further, and mounted within the lower housing 618 and within the interior 617 is a thermoelectric device 638. The thermoelectric device 638 is not shown in any further detail within any of the drawings. However, such devices are commercially available. For example, thermoelectric devices comprising heating and cooling functions which operate in response to the application of DC voltage are commercially available from the Telleurex Corporation of Traverse City, Mich. Such devices are commercially available as a unit which can include a fan assembly, air intake, heat sink, air exhaust ports, heat sink fins, insulated foam and a hot/cold plate. Such a device operates in response to 12 volt DC power input. Current direction from the DC power supply will determine whether the unit operates so as to heat liquid and other materials, or, alternatively, to cool liquids and other materials. That is, the plate 620 as shown in the drawings which would operate with and is part of the thermoelectric device 638 can be maintained as a hot plate or a cold plate. Again, units providing these heating/cooling functions and detailed descriptions of their operation are available from the Telleurex Corporation.

Figure 42:
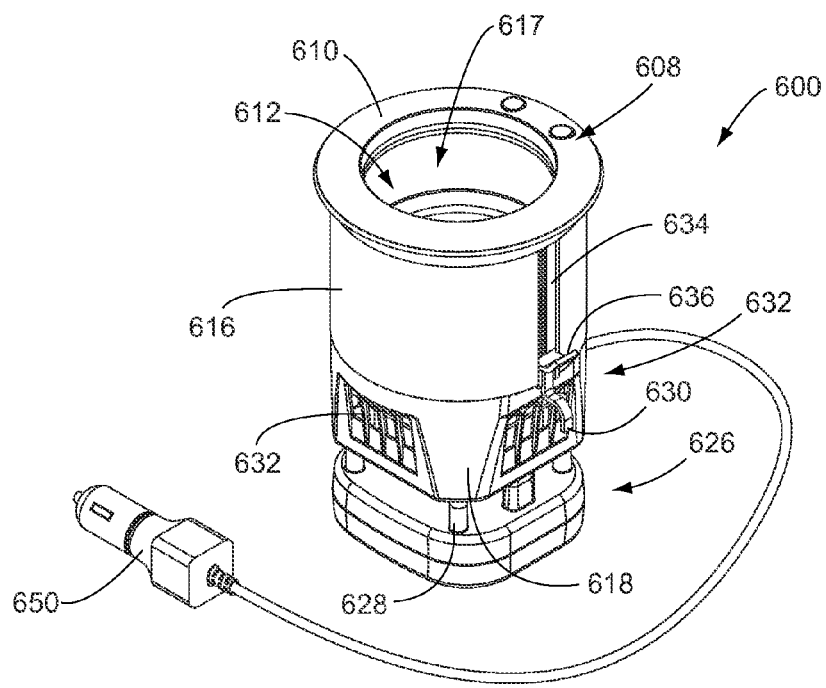
FIG. 42 is a perspective view of the hot/cold grommet assembly in accordance with the invention, showing an electrical interconnection which may be plugged into, for example, a cigarette lighter or similar type of electrical connection.
Figure 43:
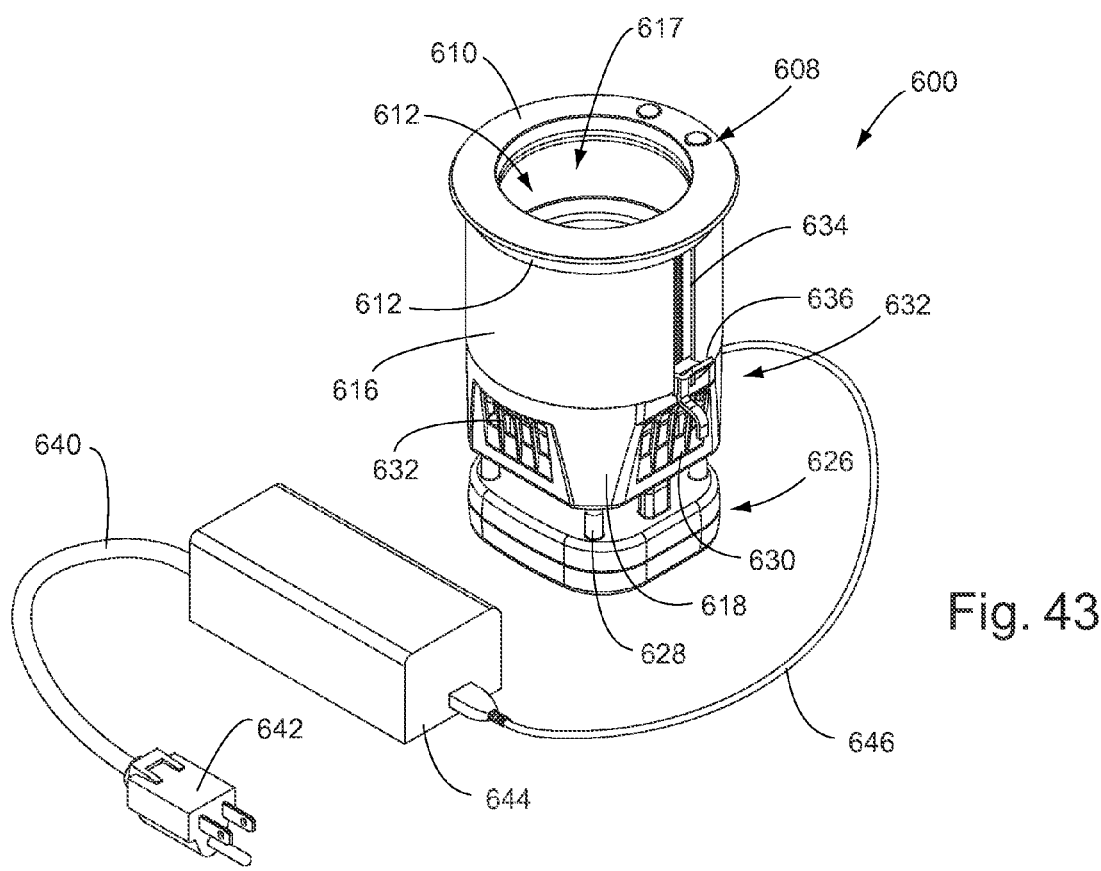
FIG. 43 is a perspective view similar to FIG. 42, but showing the hot/cold grommet assembly as used with an AC electrical plug running through a low voltage adapter.
Figure 44:
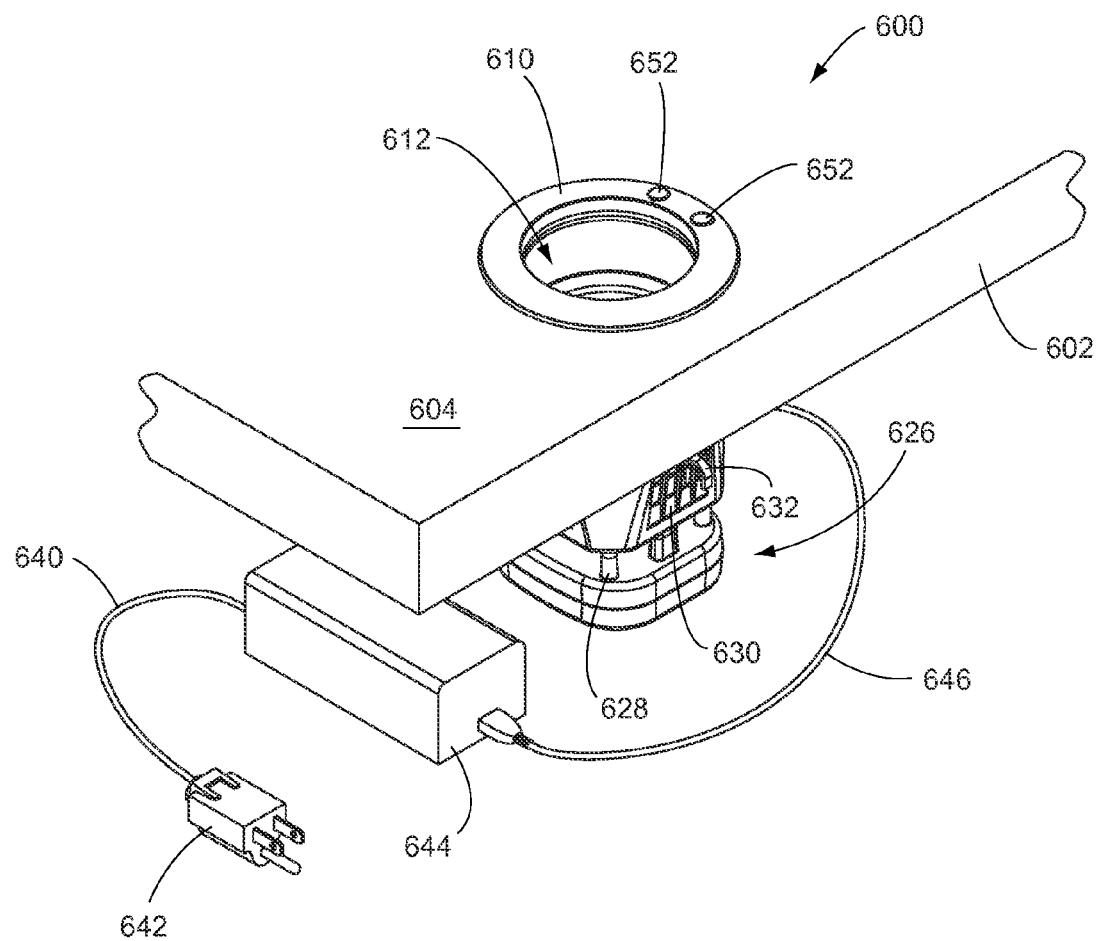
FIG. 44 is a perspective view similar to FIG. 40, but showing the hot/cold grommet assembly and the absence of the cup to be heated or cooled.

As earlier described, the thermoelectric device 638 (including the fan assembly 626) of the grommet assembly 600 requires electrical power for functional operation. For purposes of supplying electrical power to the hot/cold grommet assembly 600, reference is made to components illustrated, for example, in FIGS. 40-43. With reference to FIG. 40, the hot/cold grommet assembly 600 includes a conventional electrical cord 640 terminating in a conventional AC plug 642. The plug 642 can be plugged into a source of electrical power (not shown). The AC plug 642 would then be utilized to obtain AC power, which is applied through a DC or low voltage adapter 644. The adapter 644 is a conventional element utilized to provide for a transformer function for converting AC power to DC or low voltage power. The output from the DC adapter is applied as DC power through a low voltage cord 646 to the thermoelectric device 638. As shown in FIGS. 42 and 43, the low voltage cord 646 is connected to appropriate elements (not shown) within the thermoelectric device 638 so as to supply DC power to the device 638. As earlier stated, certain known thermoelectric devices which may be utilized with the grommet assembly 600 in accordance with the invention provide for both heating and cooling functions, dependent upon the polarity of the DC power being applied to the device. Accordingly, the grommet assembly 600 can include manually operable switches 652 or similar devices utilized to selectively reverse polarity of the DC power being applied through the low voltage cord 646 to the thermoelectric device 638.

In addition to the use of AC power, along with DC or low voltage adapters, other electrical power connections and sources of electrical power may be employed. For example, FIG. 42 illustrates a low voltage cord 648 having one end connected to the thermoelectric device 638 at an appropriate position so as to supply DC or low voltage power to the device 638. The other end of the low voltage cord 648 is connected to and terminates at a plug 650 which is conventional in nature and can plug into a jack (not shown) or other device similar to the type of jack utilized with automobile cigarette lighters. The plug 650 is adapted to plug into a jack which, unlike the AC plug 642, immediately receives a source of DC or low voltage power. Such power can be in the form of, for example, 10 or 12 volt DC. Still further, it should be emphasized that electrical power could be supplied through other types of plugs, jacks, receptacles, voltage converters and adapters.

Figure 54:
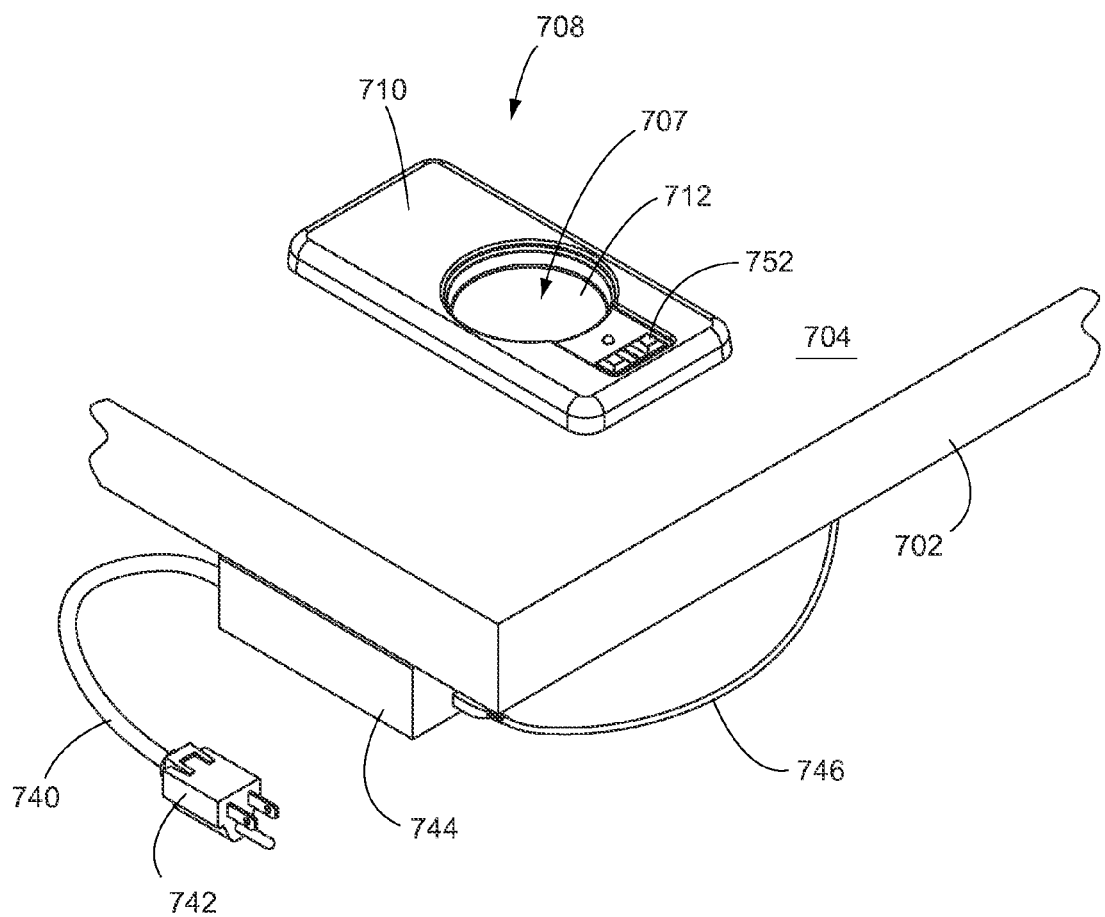
FIG. 54 is a perspective view showing the grommet assembly shown in FIG. 46 as assembled into a work surface, and showing the grommet assembly as being electrically powered through a low voltage adapter.
Figure 55:
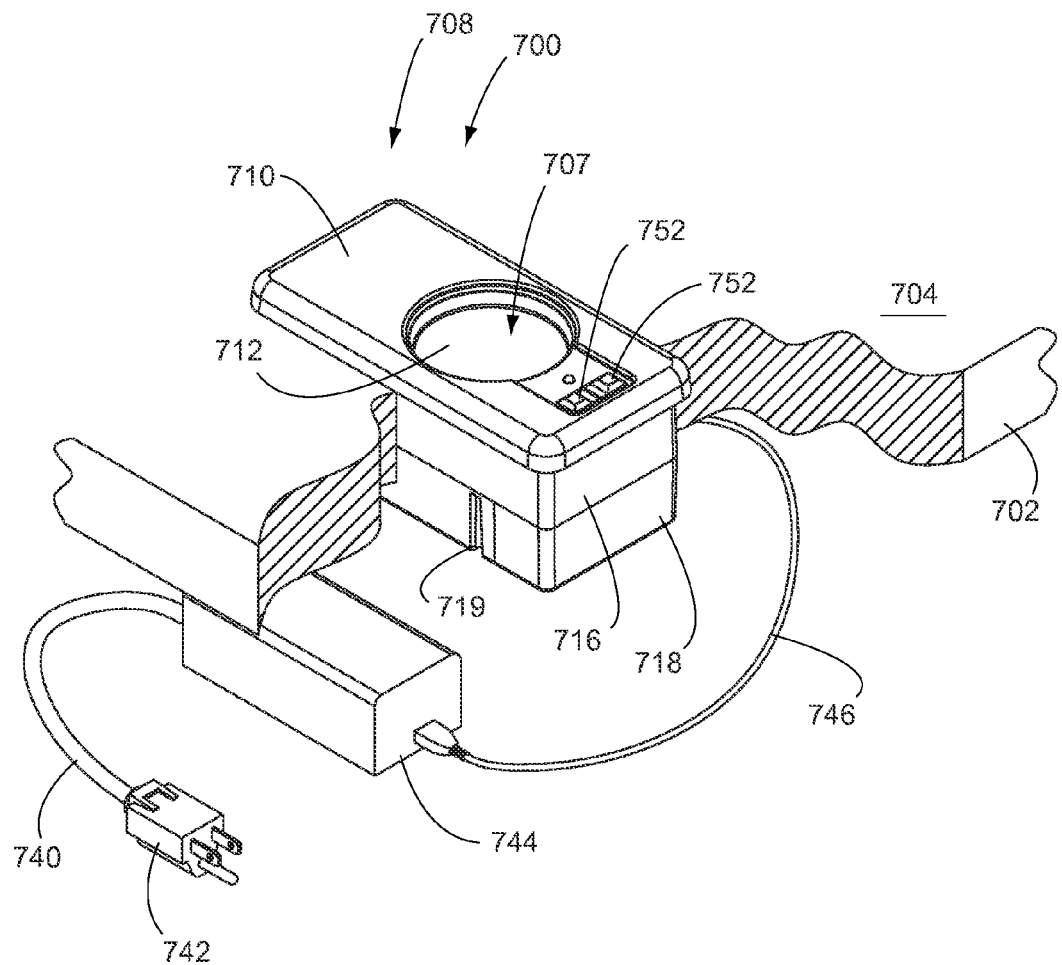
FIG. 55 is a perspective view similar to FIG. 54, but showing the work surface in a cut away configuration.
Figure 56:
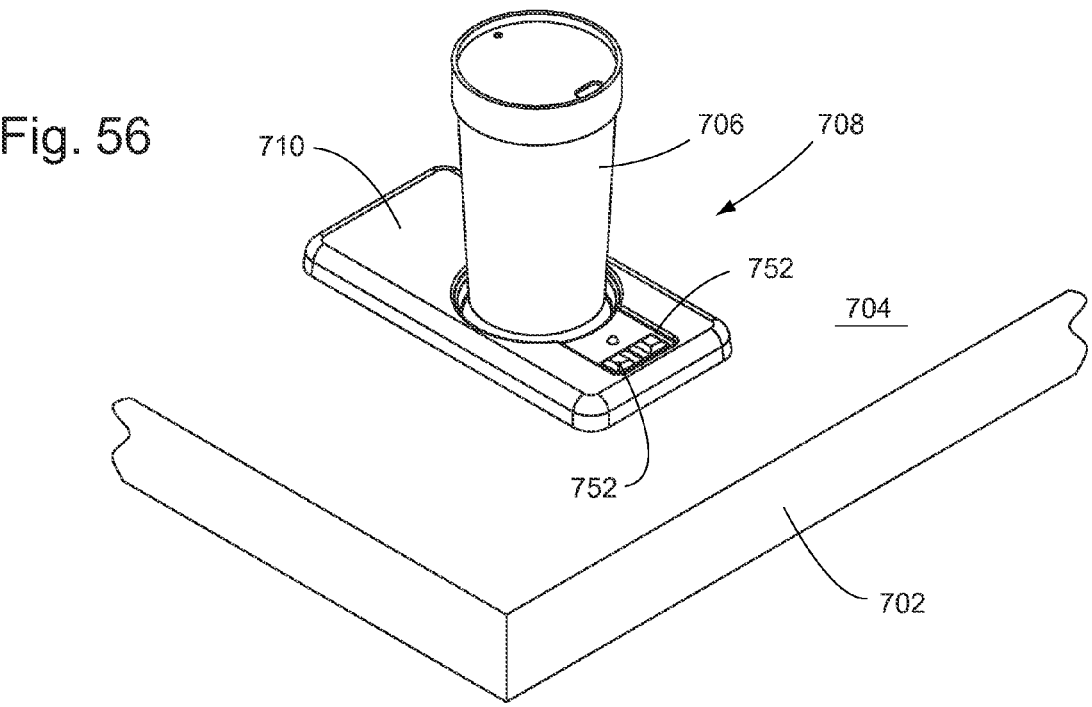
FIG. 56 is a perspective view of the grommet assembly and the work surface similar to FIG. 54, but showing a cup as being positioned on a heating/cooling plate which is substantially flush with the work surface.
Figure 57:
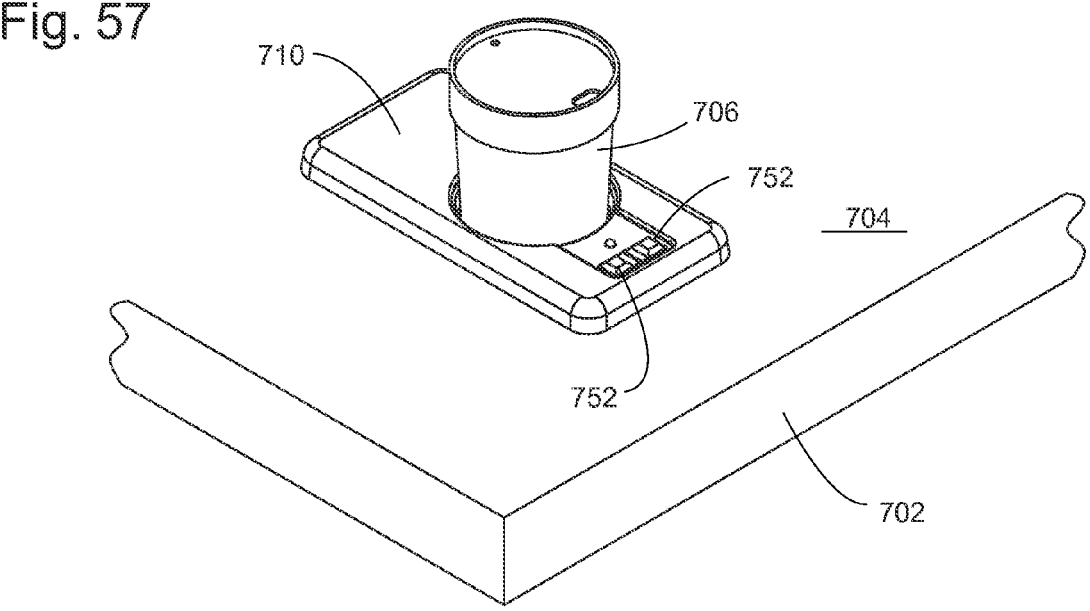
FIG. 57 is similar to FIG. 56, but shows the grommet assembly as having a recessed cup holder portion, with a cup being positioned within the recessed portion.
Figure 60:
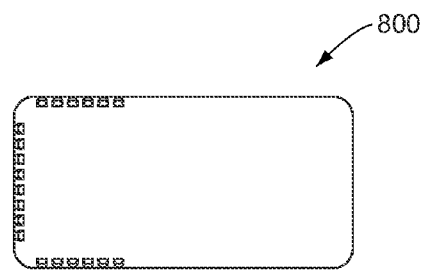
FIG. 60 is an underside view of the grommet assembly and housing shown in FIG. 59.
Figure 61:
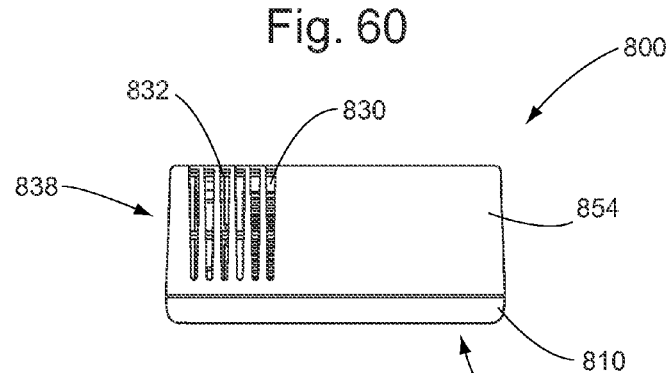
FIG. 61 is an upside down view of the grommet assembly and housing shown in FIG. 60.
Figure 62:
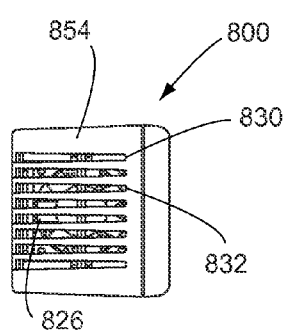
FIG. 62 is a left side view of the grommet assembly and housing shown in FIG. 60.
Figure 63:
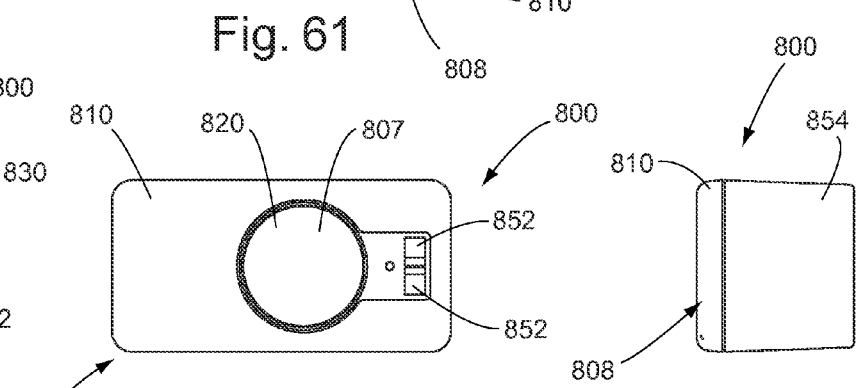
FIG. 63 is a top plan view of the grommet assembly and housing shown in FIG. 60.
Figure 64:
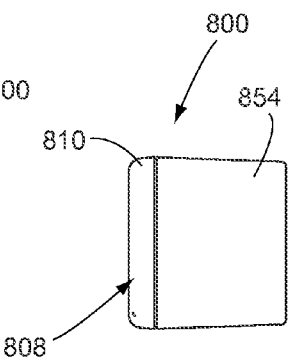
FIG. 64 is a right side view of the grommet assembly and housing shown in FIG. 60.
Figure 65:
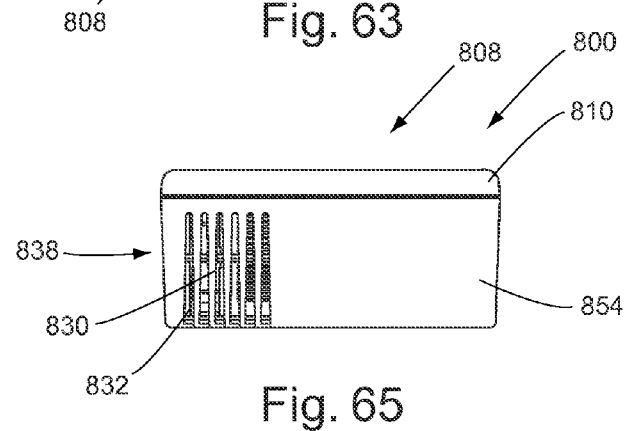
FIG. 65 is a front elevation view of the grommet assembly and housing shown in FIG. 60.

Other embodiments of hot/cold grommet assemblies in accordance with the invention may be provided, having certain structure and configurations distinct from the previously described hot/cold grommet assembly 600. For example, an embodiment in accordance with the invention is described herein as hot/cold grommet assembly 700 and illustrated in FIGS. 46-57. Many of the components of the hot/cold grommet assembly 700 correspond in function and structure to components of the hot/cold grommet assembly 600 previously described herein. Accordingly, such components will not be described in any detail. In brief summary, the hot/cold grommet assembly 600 included components associated with the thermoelectric device 638 mounted below the hot/cold plate 630. Accordingly, the grommet assembly 600 would typically be sized so as to have a greater depth than width. Alternatively, the hot/cold grommet assembly 700, although functioning in substantially the same manner as the grommet assembly 600, includes a thermoelectric device 638 and associated components essentially mounted adjacent or "to the side" of a hot/cold plate 720. More specifically, and with reference to FIGS. 46-55, the hot/cold grommet assembly 700 is shown as being mounted in FIGS. 54-57 within a work table or other furniture item 702 having an upper work surface 704. FIG. 55 illustrates the work table 702 and work surface 704 in a partial cut out configuration. In FIGS. 56 and 57, the grommet assembly 700 is further shown as supporting a coffee cup or other type of vessel 706 which may be filled with various types of liquids or other materials. In accordance with one aspect of the invention, the liquid or other material within the cup 706 may be desired by a user to be maintained in a raised temperature above ambient. Alternatively, the user may wish the liquid or other material within the cup or vessel 706 to be maintained at a cooled temperature, below ambient.

Figure 52:
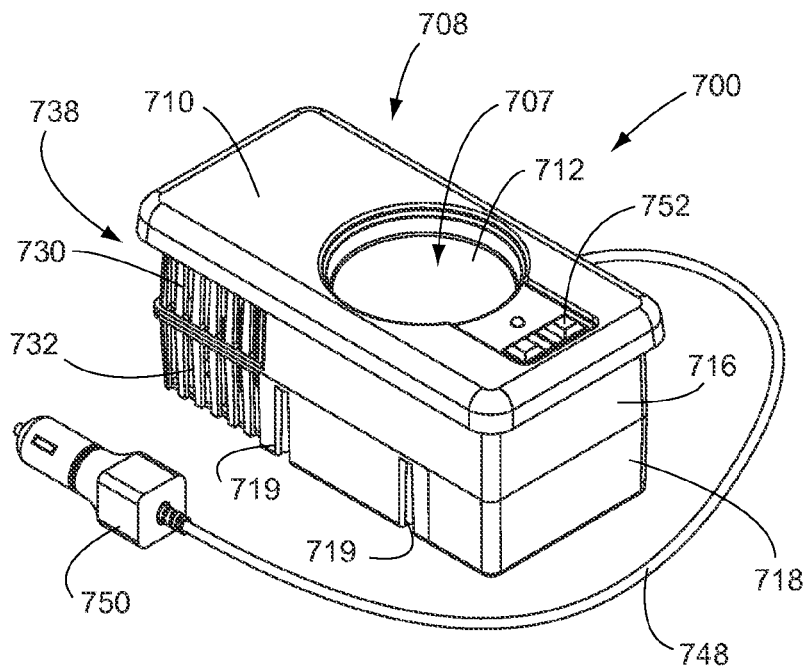
FIG. 52 is a perspective view of the grommet assembly shown in FIG. 46, and showing electrical power being supplied through a plug which is adapted to electrically connect, for example, into a cigarette lighter.
Figure 53:
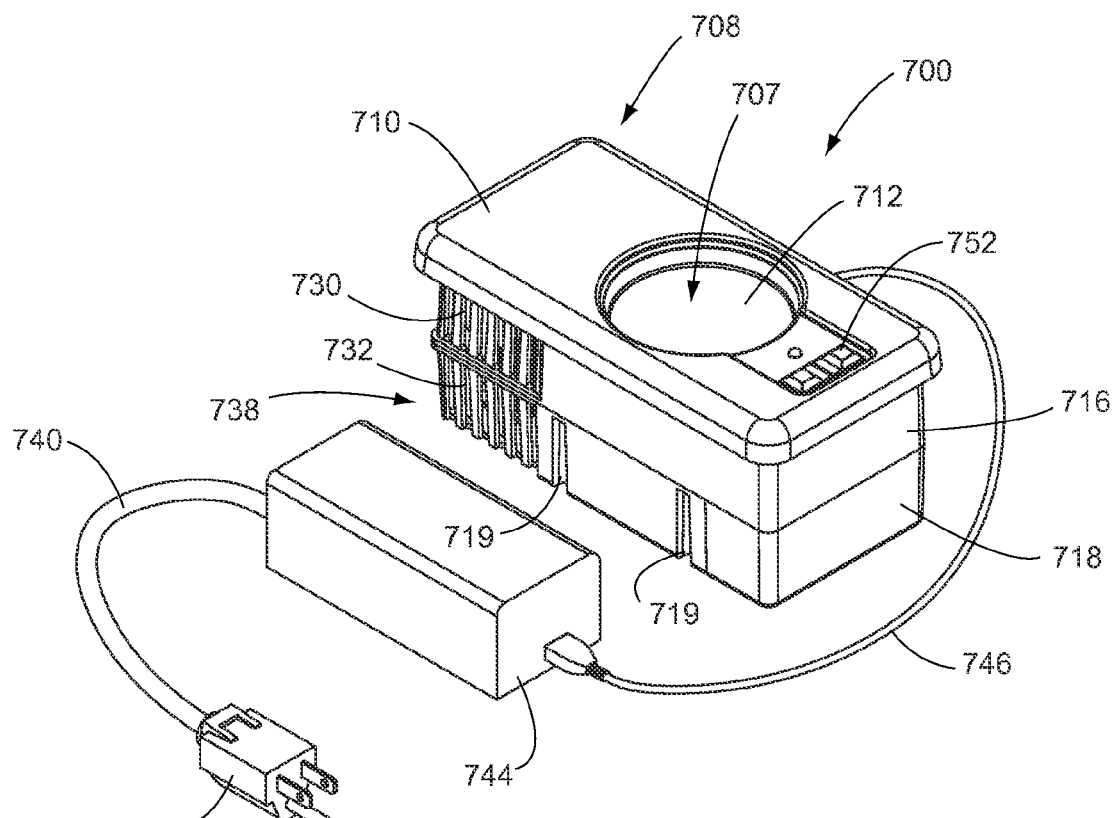
FIG. 53 is a perspective view similar to FIG. 52, but showing the grommet assembly as being electrically powered through an AC electrical plug, with the power running through a low voltage adapter.

The hot/cold grommet assembly 700 is shown in a "stand alone" configuration in FIGS. 52 and 53. With reference primarily to FIGS. 46-53, the grommet assembly 700 includes a grommet 708 adapted to be mounted within an aperture 712 cut into and through the work table 702 and work surface 704. The grommet 708 includes a lower, cylindrical casing 714. Mounted to or otherwise integral with the upper edge of the casing 714 is a horizontally disposed and rectangular upper grommet collar 710. The rectangular housing 710 can be sized and configured so as to overlap the aperture 712 cut into the work table 702 and work surface 704. Correspondingly, the grommet 708 can be mounted to or otherwise integral with an upper rectangular housing 716 and a lower rectangular housing 718 positioned therebelow. The housings 716 and 718 can form an interior 717. Also mounted through the rectangular collar 710 is a cup aperture 707 within which a coffee cup or similar holding device 706 for liquids or other materials may be placed and, if desired, recessed. Still further, within the cup holder 707 is a hot/cold plate 720 on which the coffee cup 706 may be placed for purposes of heating or cooling. As further shown in the drawings, the hot/cold grommet assembly 700 can include a fan assembly 726 positioned to the side and adjacent to the cup aperture 707. Heat sink fins 730 can also be provided, along with air exhaust ports 732. The lower housing 718 can also be provided with alignment slots 719 which can interact with corresponding notches or similar elements (not shown) within the work table 702 so as to appropriately align the grommet assembly 700 within the aperture 712 cut into the work table 702 and work surface 704.

The grommet assembly 700 can also include a series of connecting screws 734 for purposes of assisting in appropriate mounting of the grommet assembly 700 within the apertures 712. Still further, a thermoelectric device 738, substantially corresponding to the thermoelectric device 638 previously described herein, can be utilized with the grommet assembly 700. Still further, and as illustrated in FIG. 52, DC or low voltage power can be supplied to the thermoelectric device 738 through power transmitted through plug 750 (FIG. 52) which may be plugged into a cigarette lighter jack or similar jack. Power is supplied through the low voltage cord 648 which is connected to the thermoelectric device 738. Correspondingly, FIGS. 53, 54 and 55 illustrate the use of an electrical cord 740, AC plug 742, DC or low voltage adapter 744 and low voltage cord 746 for appropriately supplying DC or low voltage power to the thermoelectric device 738 from an initial source of AC power.

Still further, for purposes of enabling or disabling the thermoelectric device 738 of the grommet assembly 700, and for purposes of selecting DC polarity so as to provide for either a heating or cooling function, the grommet assembly 700 can include an appropriate set of switches 752 mounted, for example, on the rectangular collar 710 as illustrated in a number of the drawings, including FIGS. 52-55. Still further, FIG. 56 illustrates the grommet assembly 700 with a hot/cold plate 720 which is positioned substantially flush with the work surface 704. As an alternative configuration, FIG. 57 illustrates the grommet assembly 700 with the hot/cold plates 720 being recessed within the cup aperture 707.

A further embodiment of the invention is illustrated as hot/cold grommet assembly 800 described herein and shown in FIGS. 58-69. A substantial number of the elements and components of the grommet assembly 800 correspond to those of the grommet assembly 600 and 700, and will not be described in any detail herein. The grommet assembly 800 is similar to the grommet assembly 700, in that the components associated with the thermoelectric device and elements are located adjacent the cup aperture. However, unlike the grommet assembly 600 and the grommet assembly 700, where the assemblies are designed to be located within an aperture of a work table, the grommet assembly 800 is adapted to be mounted on top of a work surface.

Figure 67:
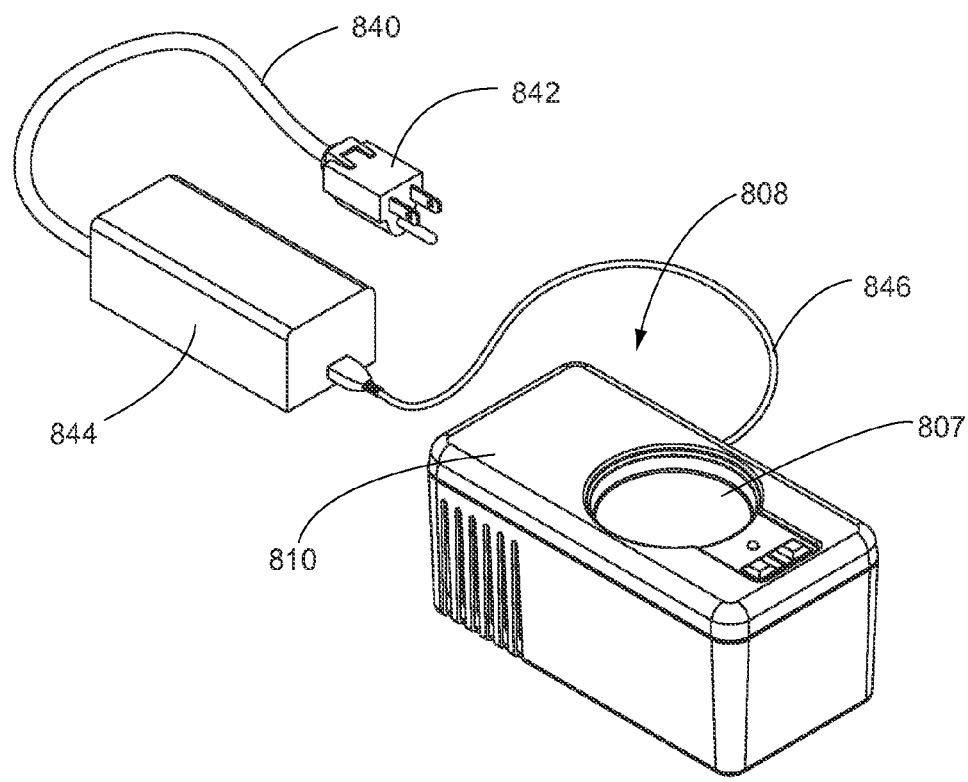
FIG. 67 is a perspective view of the grommet assembly and housing similar to FIG. 66, but showing the grommet assembly as being powered through an AC electrical plug which runs power through a low voltage adapter.
Figure 68:
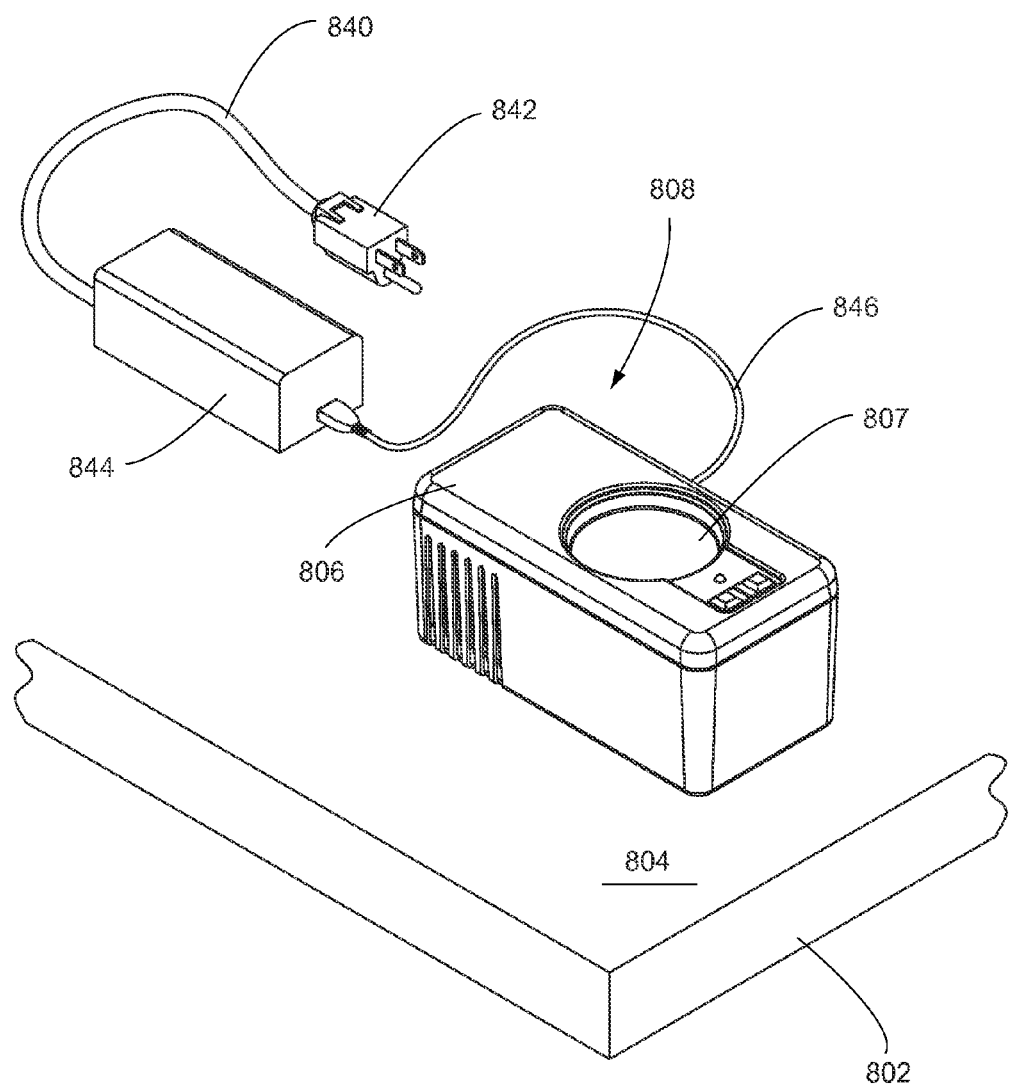
FIG. 68 is a perspective view of the grommet assembly similar to FIG. 67, but showing the grommet assembly as being positioned on a work surface.
Figure 69:
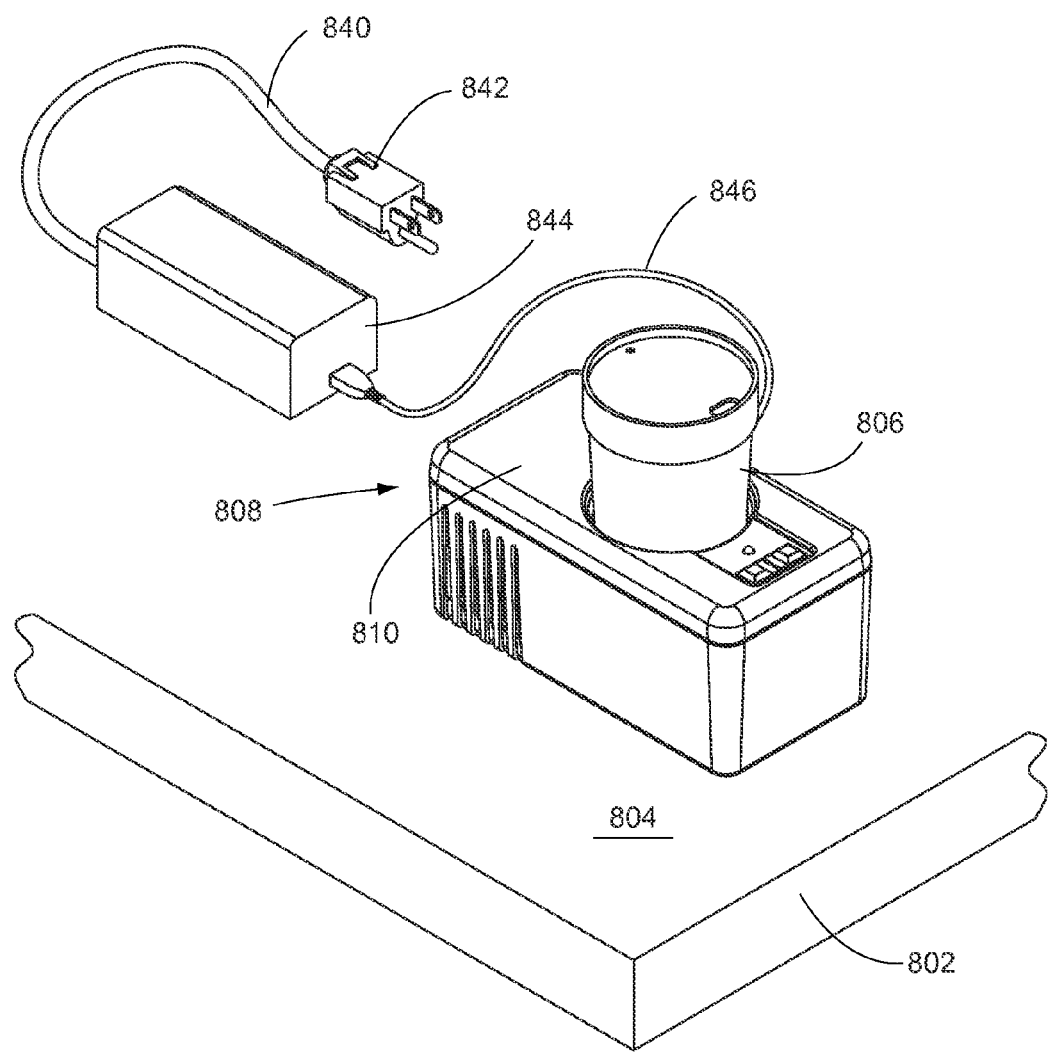
FIG. 69 is a perspective view of the grommet assembly and housing, positioned on a work surface similar to FIG. 68, but showing a cup within a recessed cup holder portion of the grommet assembly.

Turning to FIGS. 58-69, the grommet assembly 800 includes an upper grommet 808. The grommet 808 includes a rectangular collar 810 having a cup aperture 807 positioned therein. Mounted below or otherwise integral with the annular rectangular collar 810 is a rectangular upper housing 816. Connected to or otherwise integral with the upper rectangular housing 816 is a lower rectangular housing 818. The upper housing 816 and lower housing 818 form an interior 817. Alignment slots 819 are positioned within the lower rectangular housing 818. The cup aperture 807 is formed within the rectangular collar 810. Positioned within the cup aperture 807 is a hot/cold plate 820. As shown in FIG. 69, a coffee cup 806 or similar object holding liquids or other materials to be heated or cooled may be placed within the cup aperture 807 on the hot/cold plate 820. The hot/cold plate 820 is adapted to be heated or cooled, as desired by the user, so as to maintain the temperature of liquid or other material within the cup 806 at a temperature above or below ambient, respectively.

Figure 66:
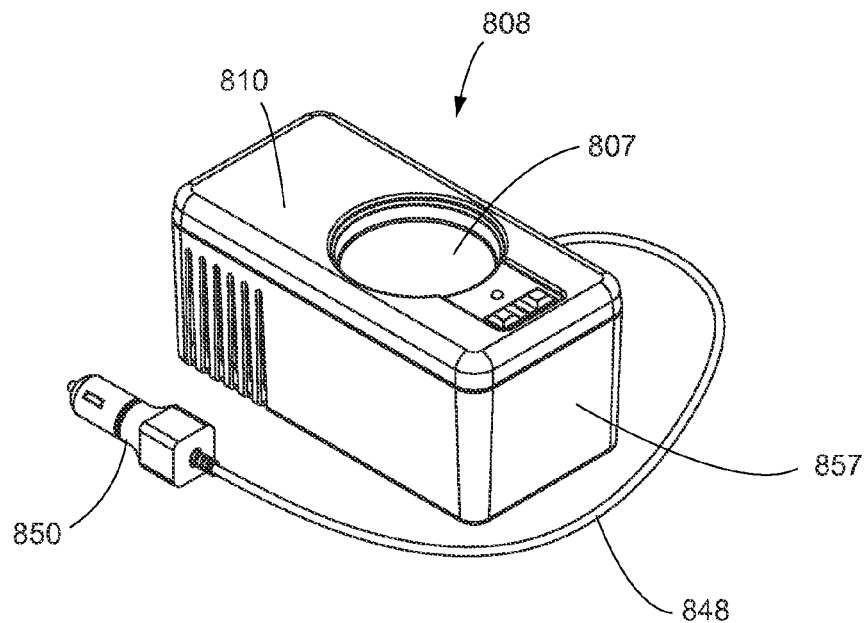
FIG. 66 is a perspective view of the grommet assembly and housing similar to FIG. 59, but showing the grommet assembly as being powered through an electrical cord having a plug which may be utilized, for example, with a cigarette lighter.

As earlier stated, and similar to the grommet assembly 700, the grommet assembly 800 includes its thermoelectric components positioned to the side or otherwise adjacent to the cup aperture 807. As shown in the drawings, the grommet assembly 800 includes heat sink fins 830 and air exhaust ports 832. Although not specifically shown in the illustrations for the grommet assembly 800, the assembly 800 also includes a number of other thermoelectric components corresponding to those of the grommet assemblies 600 and 700. For example, the grommet assembly 800 can include a fan assembly (similar to the fan assemblies 626 and 726 previously described herein) and a thermoelectric device (similar to the thermoelectric devices 638 and 738 previously described herein). Also, as shown, for example, in FIGS. 58 and 63, the grommet assembly 800 can include a set of switches 852 for purposes of enabling and disabling the thermoelectric components of the grommet assembly 800, and also for switching DC polarity of incoming DC power, so as to select either a heating function or a cooling function for the hot/cold plate 820. Still further, and as shown in FIG. 66, the grommet assembly 800 can include a plug 850 which is adapted to be received by a jack or similar source of DC power, such as a cigarette lighter or the like. The plug 850 is connected to the low voltage cord 848 which, in turn, is connected in an appropriate manner to the thermoelectric device of the grommet assembly 800. Still further, and as shown in FIGS. 67, 68 and 69, the grommet assembly 800 may be powered from a source of AC power through an AC plug 842 which is connected through an electrical cord 840 to a DC or low voltage adapter 844. The output of the adapter 844 is DC or low voltage power which is then supplied through the low voltage cord 848 to the thermoelectric device of the grommet assembly 800. In addition to the foregoing, the grommet assembly 800 can also include an outer housing shield 854, as shown in a number of the drawings. A stand alone configuration of the housing shield 854 is illustrated in FIG. 58. The housing shield 854 can be secured around the upper housing 816 and lower housing 818 of the grommet assembly 800 in any appropriate manner, including use of notches or the like (not shown) which can be aligned with the alignment slots 819. The outer shield 854 protects the user from coming into contact with components of the thermoelectric device and also provides for aesthetics for the grommet assembly 800. Again, the primarily distinction between the grommet assembly 700 and the grommet assembly 800 is that the grommet assembly 800 is adapted to be mounted on top of the work surface 804, while the grommet assembly 700 is adapted to be mounted within an aperture formed through the work table 702 and work surface 704 in a recessed manner.

Figure 70:
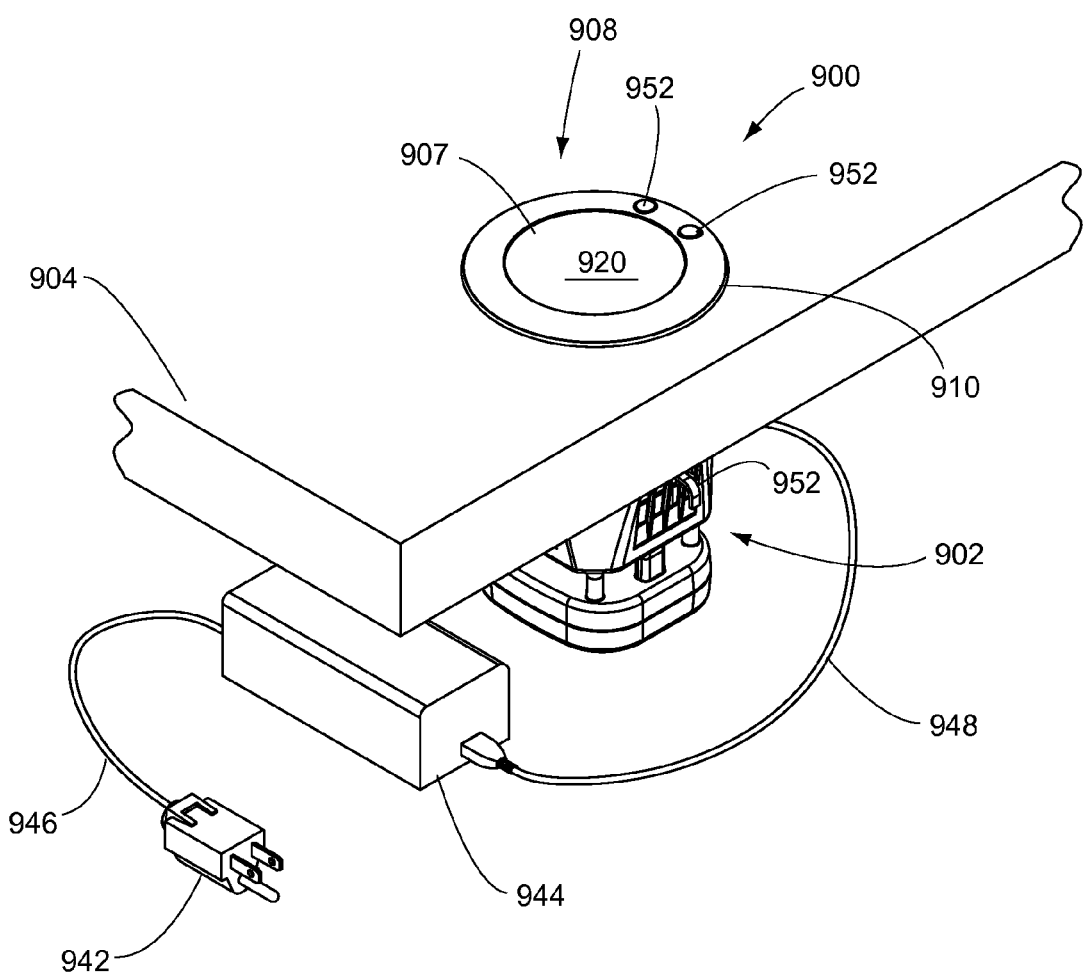
FIG. 70 is a perspective view of a further grommet assembly and housing, positioned on a work surface in a manner similar to FIG. 68, but showing the hot/cold plate as being substantially flush with the upper portion of the grommet assembly.
Figure 71:
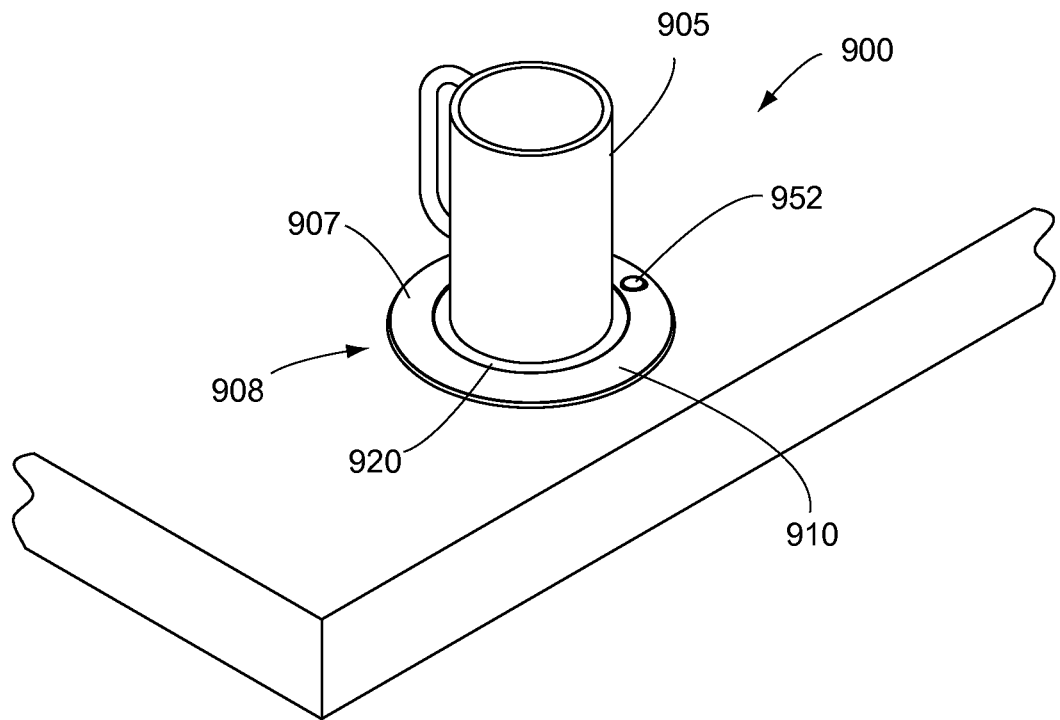
FIG. 71 is a perspective view showing the grommet assembly and work surface previously shown in FIG. 70, but showing a cup positioned on the flush hot/cold plate for purposes of warming liquid within the cup.
Figure 72:
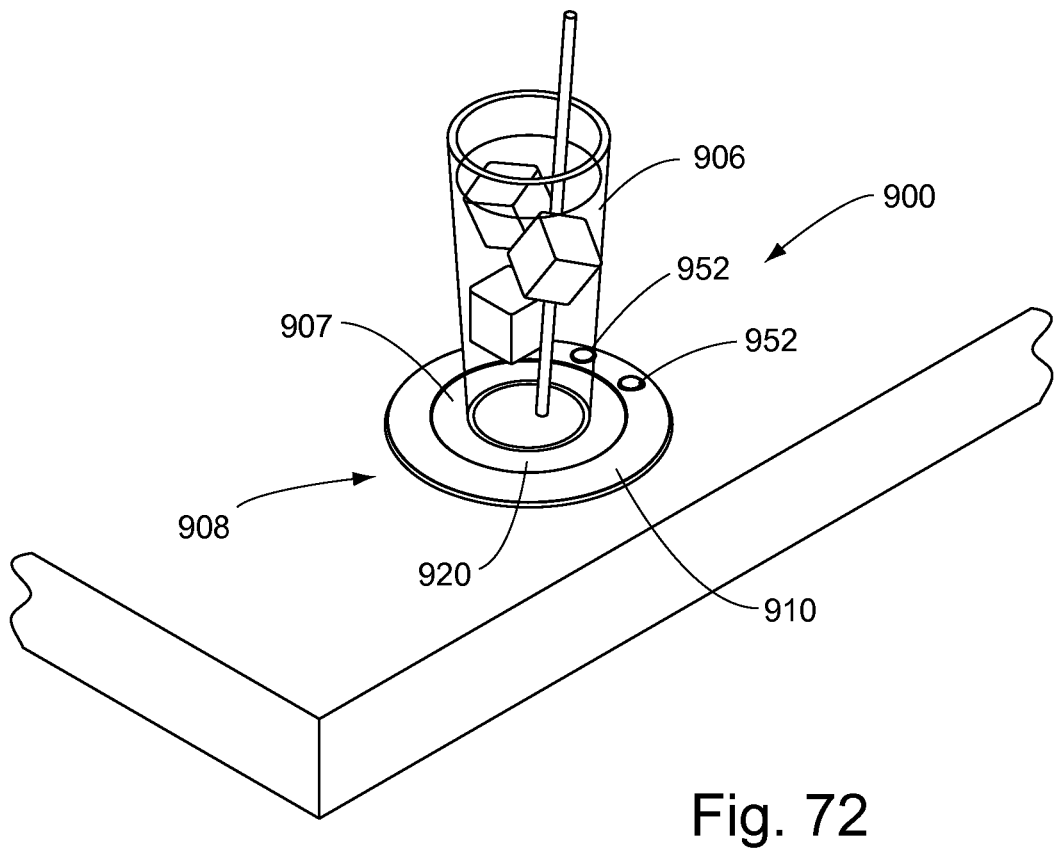
FIG. 72 is a perspective view similar to FIG. 71, but showing a glass with ice cubes positioned on the flush hot/cold plate, and with the hot/cold plate adapted to cool liquid within the cup or glass below in ambient temperature.

A further embodiment of a grommet assembly in accordance with the invention is shown as grommet assembly 900 in FIGS. 70, 71 and 72. FIG. 70 shows the grommet assembly 900 as having a grommet configuration mounted to the top of the work surface 904, with a hot/cold plate 920 positioned within the grommet assembly and substantially flush with the upper portion of the work surface 904. With reference primarily to FIG. 70, the grommet assembly 900 includes an upper grommet 908. The upper grommet 908 includes an annular collar 910 which is positioned at the top of a housing (not completely shown). The collar 910 circumscribes a cup aperture 907 positioned therein. The cup aperture 907 is formed within the collar 910 and positioned within the cup aperture 907 is a hot/cold plate 920. Located below the grommet 908 and the hot/cold plate 920 is a thermoelectric assembly 902. The thermoelectric assembly 902 can be operated so as to provide heating or cooling functions, and may be operated by switches 952. These switches can also be utilized for switching DC plurality of incoming DC power, so as to select either the heating function or the cooling function. Still further, the grommet assembly 900 can include a plug (not shown) which can be adapted to be received by a jack or similar source of DC power. The plug can be connected to a low voltage cord 948 which, in turn, is connected in an appropriate manner to the thermoelectric assembly 902. Also, the grommet assembly 900 may be powered from a source of AC power through an AC plug 942 which is connected to an electrical cord 940 to a DC or low voltage adapter 944. The output of the adapter 944 is DC or low voltage power which is then supplied through the low voltage cord 948 to the thermoelectric device 902.

FIG. 71 illustrates the use of a cup 905 having liquid therein which is to be heated or otherwise warmed by the thermoelectric assembly 902 and the hot/cold plate 920. Again, it should be emphasized that the hot/cold plate 920 is flush with the upper grommet 908 and the upper portion of the work surface 904. Correspondingly, FIG. 72 illustrates the use of a glass 906 having ice cubes therein and having liquid which is to be cooled below ambient temperature by the thermoelectric device 902. In accordance with all of the foregoing, the grommet assembly 900 provides for both heating and cooling functions, while maintaining a hot/cold surface on which to place the vessel to be warmed in a manner so that it is substantially flush with the upper portion of the work surface and an upper grommet.

It will be apparent to those skilled in the pertinent arts that other embodiments of grommet assemblies in accordance with the invention can be achieved. That is, the principles of grommet assemblies in accordance with the invention are not limited to the specific embodiments described herein. It will be apparent to those skilled in the art that modifications and other variations of the above-described illustrative embodiments of the invention may be effected without departing from the spirit and scope of the novel concepts of the invention.

What is claimed is:

1. A hot/cold grommet assembly for maintaining liquid or other materials in a vessel at a desired temperature, said grommet assembly being mounted to or on a work table or other furniture item having a work surface, said grommet assembly comprising:

a grommet having a casing received within an aperture extending through said work surface, said grommet having a lower casing and an upper collar, said lower casing forming a housing interior;

heating means selectable by a user and positioned within a housing interior, and coupled to a hot/cold plate for selectively maintaining said liquid or other materials at a desired temperature above ambient temperatures of said liquid or other materials within said vessel, with said vessel positioned on said hot/cold plate; and cooling means positioned within said housing interior, and coupled to said hot/cold plate, for maintaining the temperature of said liquid or other materials in said vessel at a temperature below ambient temperature of said liquid or other materials within said vessel;

power means connected to said heating means and said cooling means and connectable to a source of electrical power, so as to energize said heating means and said cooling means; and said upper collar of said grommet being positioned substantially flush with said work surface, and said hot/cold plate also being positioned substantially flush with said work surface; and said heating means further comprises at least two alignment elements mounted outside of said housing interior, said alignment elements adapted to be received within corresponding ones of alignment slots positioned on interior surfaces of said casing, so as to maintain said heating means in an appropriate alignment relative to said grommet.

2. A hot/cold grommet assembly in accordance with claim 1, characterized in that said power connection means comprises:

an AC electrical plug adapted to be plugged into a source of AC electrical power;

an electrical AC cord connected at one end to said AC plug;

a DC or low voltage adapter connected to another end of said AC electrical plug; and a DC or low voltage electrical cord connected at one end to an output of said DC or low voltage adapter, and connected at an opposing end to said heating means and said cooling means, so as to energize said heating means and said cooling means.

3. A hot/cold grommet assembly in accordance with claim 1, characterized in that said power connection means comprises:

a plug or jack adapted to be directly connected to a source of DC or low voltage power;

a DC or low voltage electrical cord connected at one end to said DC or low voltage plug or jack, and connected at an opposing end to said heating means and to said cooling means, so as to energize said heating means and said cooling means.

4. A hot/cold grommet assembly in accordance with claim 1, characterized in that said grommet assembly is adapted to be positioned completely on top of said work surface.

5. A hot/cold grommet assembly in accordance with claim 1, characterized in that thermoelectric components of said hot/cold grommet assembly are positioned to a side of and below said upper collar and said hot/cold plate.

6. A hot/cold grommet assembly in accordance with claim 1, characterized in that said outer surface of said casing comprises a plurality of press-fit ribs, so as to provide a friction fit with an inner surface of said aperture when said grommet is received within said aperture.

* * * * *